United States Patent
Benore et al.

(10) Patent No.: US 8,322,601 B1
(45) Date of Patent: Dec. 4, 2012

(54) IN WALL ROTATING DEVICE FOR EXCHANGING ITEMS BETWEEN SERVICE PROVIDER AND DRIVE-THROUGH LANE CUSTOMER

(75) Inventors: Randolph C. Benore, North Canton, OH (US); Robert V. Artino, North Canton, OH (US); Daniel S. McIntyre, Uniontown, OH (US); Rodney J. Reese, New Philadelphia, OH (US)

(73) Assignee: Diebold, Incorporated, North Canton, OH (US)

( * ) Notice: Subject to any disclaimer, the term of this patent is extended or adjusted under 35 U.S.C. 154(b) by 1301 days.

(21) Appl. No.: 12/004,754

(22) Filed: Dec. 21, 2007

Related U.S. Application Data

(60) Provisional application No. 60/878,221, filed on Jan. 3, 2007.

(51) Int. Cl.
  G06Q 40/00 (2012.01)
  G07D 11/00 (2006.01)
  G07F 19/00 (2006.01)
  E06B 7/32 (2006.01)
(52) U.S. Cl. .............. 235/379; 109/19; 902/33
(58) Field of Classification Search ........... 235/379; 109/19; 902/33
  See application file for complete search history.

(56) References Cited

U.S. PATENT DOCUMENTS

| | | | |
|---|---|---|---|
| 1,335,601 A | 3/1920 | Povey | |
| 1,342,673 A | 6/1920 | Hecht | |
| 1,669,539 A | 5/1928 | Smart | |
| 1,924,330 A | 8/1933 | Scheeler | |
| 2,577,401 A * | 12/1951 | Calcutt et al. | 232/1 E |
| 3,135,567 A * | 6/1964 | Braunsberg | 312/97.1 |
| 3,474,745 A * | 10/1969 | Schlaefli | 109/19 |
| 4,158,999 A | 6/1979 | Sukolics | |
| 4,209,179 A * | 6/1980 | Tolliver | 277/605 |
| 4,217,833 A | 8/1980 | Sukolics | |
| 4,235,045 A * | 11/1980 | Nineberg | 49/41 |
| 4,702,037 A | 10/1987 | Hollowell et al. | |
| 4,735,289 A * | 4/1988 | Kenyon | 186/37 |
| 5,558,417 A * | 9/1996 | Termotto | 312/249.9 |
| 5,713,648 A * | 2/1998 | Geib et al. | 312/249.2 |
| 5,805,454 A * | 9/1998 | Valerino et al. | 700/215 |
| 6,146,057 A * | 11/2000 | Gromley et al. | 406/10 |
| 6,672,808 B1 * | 1/2004 | McIntyre et al. | 406/197 |
| 6,702,150 B2 * | 3/2004 | Sumetzberger | 221/265 |
| 6,726,101 B1 * | 4/2004 | McIntyre et al. | 235/382 |
| 2006/0218063 A1 * | 9/2006 | Vogt | 705/35 |

* cited by examiner

Primary Examiner — Thien M Le
Assistant Examiner — Toan Ly
(74) Attorney, Agent, or Firm — Ralph E. Jocke; Daniel D. Wasil; Walker & Jocke

(57) ABSTRACT

A system operated responsive to data included on data bearing cards enables carrying out transactions between a service provider and a customer. Customers may be located within a vehicle in a drive-through lane adjacent to a building which houses a service provider station. Financial accounts may be assessed charges for items based on data read from cards. The customer and service provider may exchange items through a pneumatic tube conveyor system. Alternatively items may be exchanged through a rotating device which provides for selectively positioning items at delivery stations at different vertical heights. The service provider positions items at a suitable level for exchange with the customer based on the height associated with the user in their vehicle.

26 Claims, 16 Drawing Sheets

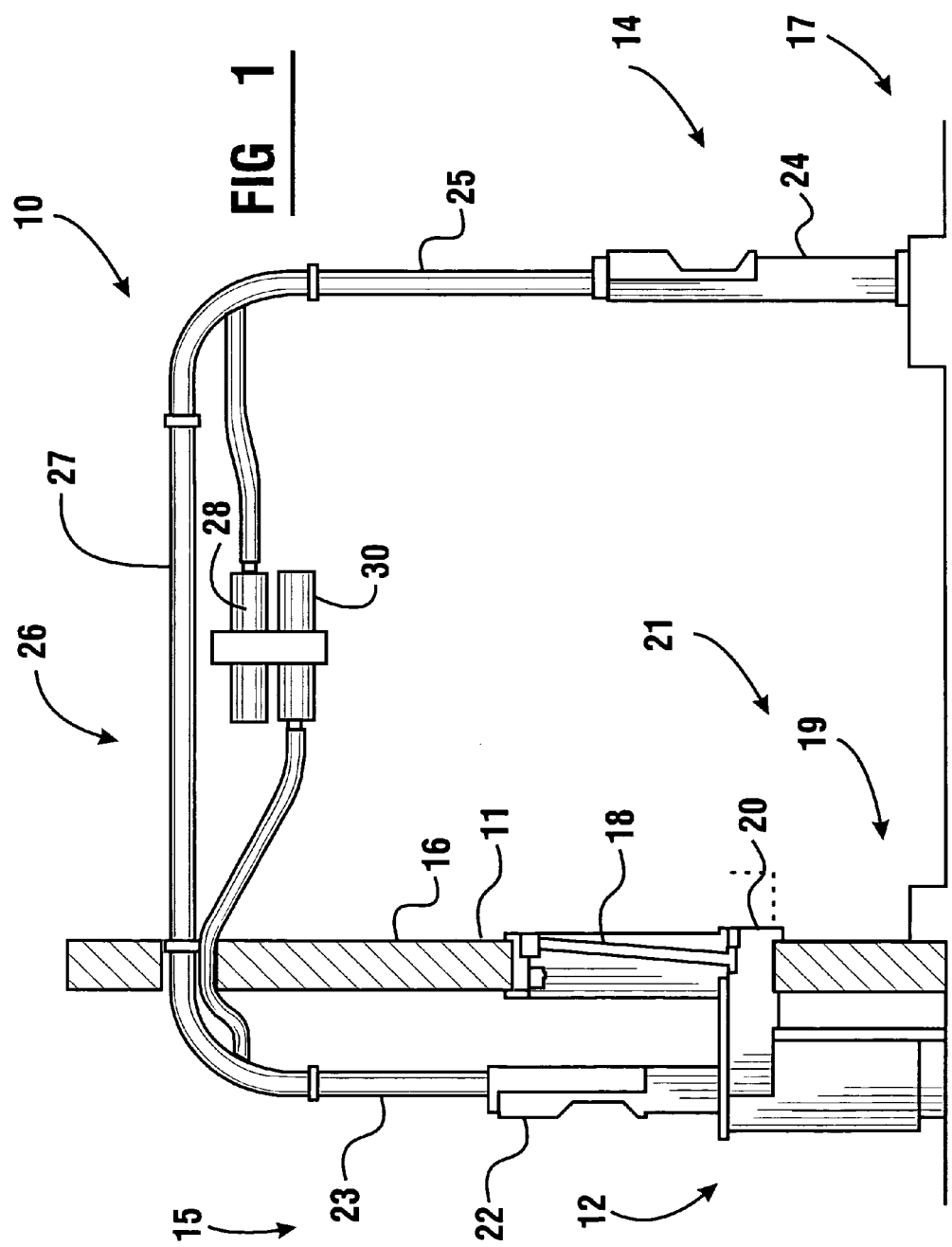

IN WALL ROTATING DEVICE FOR EXCHANGING ITEMS BETWEEN SERVICE PROVIDER AND DRIVE-THROUGH LANE CUSTOMER

CROSS REFERENCE TO RELATED APPLICATION

This application claims the benefit of U.S. Provisional Application No. 60/878,221, filed Jan. 3, 2007, the disclosure of which is incorporated herein by reference.

TECHNICAL FIELD

This invention relates to systems controlled by data bearing records which may be classified in U.S. Class 235, Subclass 379.

BACKGROUND ART

Systems which are controlled by data included on data bearing records are known in prior art. Such systems may be used to conduct transactions between a service provider and remotely located customers. Such systems have been used in banking applications as well as in other transaction environments.

Despite the effectiveness of such systems there is still room for improvements.

OBJECTS OF EXEMPLARY EMBODIMENTS

It is an object of an exemplary embodiment to provide a system that is controlled responsive to data included on data bearing records.

It is an object of an exemplary embodiment to provide an apparatus through which a customer may conduct a transaction with a service provider.

It is a further object of an exemplary embodiment to provide a transaction system through which a customer may conduct a transaction with a remote service provider without requiring the customer to surrender their card or other coded record including account data or data representative of value.

It is a further object of an exemplary embodiment to provide a transaction system that facilitates accomplishing transactions with customers in vehicles at different heights.

It is a further object of an exemplary embodiment to provide a method of operation of a system that operates responsive to data included on coded records.

Further objects of exemplary embodiments will be made apparent in the following Detailed Description of Exemplary Embodiments and the appended claims.

The foregoing objects may be accomplished in an exemplary embodiment by a system in which a pneumatic transfer apparatus transfers a carrier through a pneumatic tube by air pressure between a customer station and a service provider station. The exemplary system includes a carrier which may incorporate or have engaged therewith a body. The exemplary body includes a card reader and a keypad. The exemplary body further includes a processor and a memory in operative connection with a card reader and keypad. The exemplary body further includes at least one output device.

In an exemplary embodiment the customer at the customer station requests to purchase items, such as pharmacy items, from the service provider. This may include, for example, prescription medications that are to be delivered from a pharmacy. The service provider determines a total amount due from the customer. The body is then delivered to the customer station. The customer then passes his card through the card reader on the body and, if appropriate, inputs a PIN through a keypad on the body. The card and PIN data input by the customer is then stored in the memory of the body.

The body is then transferred through the pneumatic tube to the service provider station. In response to an input at the service provider station, the body outputs through the output device signals corresponding to the input customer data. The signals are then used to process a charge against a customer's account. If the customer's account is successfully charged, the items may be delivered to the customer through the pneumatic tube system.

In some embodiments, the body which is used to transfer the customer account data may be integral with the carrier that is transported between the service provider station and the customer station through a pneumatic tube. In alternative embodiments, the body used to transfer such data may be removably positionable in an interior area of a carrier which is moved between a service provider station and a customer station. In some further exemplary embodiments, the body may also be movable between customers and the service provider through other means, such as through a movable drawer or other mechanism that enables the body to be moved between the customer and the service provider.

In other exemplary embodiments data corresponding to financial accounts may be communicated from a coded record such as a contactless card to a card reader operatively connected to the service provider station.

In some embodiments a service provider may transfer items to a customer using a mechanism that delivers items at a height that is suitable for the particular customer. For example customers in a drive-through lane may provide or receive items from a delivery station at a height that is suitable for the height of the customer in their particular vehicle. This enables more readily servicing each of the customers in the varied types of vehicles that pass through the drive-through lane. In some embodiments customers may be serviced from delivery stations on a rotatable device, on which delivery stations are movable between an interior area and an exterior area of a building. In other embodiments customers may be serviced from delivery stations that are in communication with a service provider station through a pneumatic tube conveyor or other suitable transfer device.

BRIEF DESCRIPTION OF DRAWINGS

FIG. 1 is a schematic view of a transaction system including a pneumatic transfer apparatus used for carrying out transactions in an exemplary embodiment.

DETAILED DESCRIPTION OF EXEMPLARY EMBODIMENTS

Figure 3:
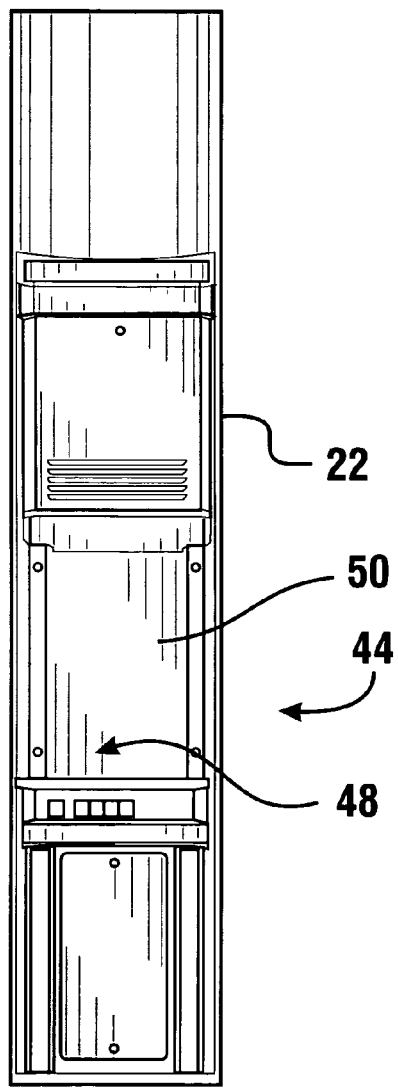
FIG. 3 is a front plan view of the portion of the service provider station shown in FIG. 2.

Referring now to the drawings and particularly to FIG. 1, there is shown therein an exemplary embodiment of the transaction system generally indicated 10. The transaction system 10 includes a service provider station, generally indicated 12, and a customer station, generally indicated 14. In an exemplary embodiment, the service provider station is positioned within a facility from which goods or services are provided. In one exemplary embodiment, the service provider station is positioned adjacent to a pharmacy operation which enables pharmacy items, such as medications, to be delivered to customers adjacent to the customer station 14. In the exemplary embodiment, customer station 14 is positioned adjacent to a drive-through lane in which customers may carry out transactions while positioned in a vehicle. Of course it should be understood that in other embodiments the facility may provide services such as banking services.

In the exemplary embodiment, the service provider station is also positioned adjacent to a drive-through window 18. A movable drawer mechanism 20 may be used by the service provider at the service provider station to exchange items with customers at a customer station 21 which is a drive-through lane adjacent to the drawer mechanism 20.

The exemplary service provider station includes a service provider terminal 22. The exemplary customer station includes a customer terminal 24. Terminals 22 and 24 are connected by a pneumatic tube transfer conduit 26. The pneumatic tube transfer conduit includes a first generally vertically extending leg portion 23 which is adjacent to and in communication with the service provider terminal 22. The second generally vertically extending leg portion 25 is adjacent to and in communication with the customer terminal 24. A transversely extending portion 27 extends generally horizontally between the first and second leg portions. The transverse portion 27 is connected to the vertically extending leg portions through radiused bends in the conduit which are radiused to enable the passage of a pneumatic carrier therethrough between the service provider terminal and the customer terminal.

A first blower 28 is connected to transfer conduit 26 generally in the area above the customer terminal 24. Blower 28 may be selectively operated to draw negative pressure in the transfer conduit in the area generally above the customer terminal. Blower 28 further includes suitable valving so that when the blower 28 is not operated, air is generally prevented from entering the transfer conduit 26 through the blower 28. A blower 30 similar to blower 28 is connected to the transfer conduit in the area generally above service provider terminal 22. Blower 30 may be operated to selectively produce negative pressure in the transfer conduit above the service provider terminal. Like blower 28, when blower 30 is not operating, air is generally prevented from entering the transfer conduit through the blower.

Figure 5:
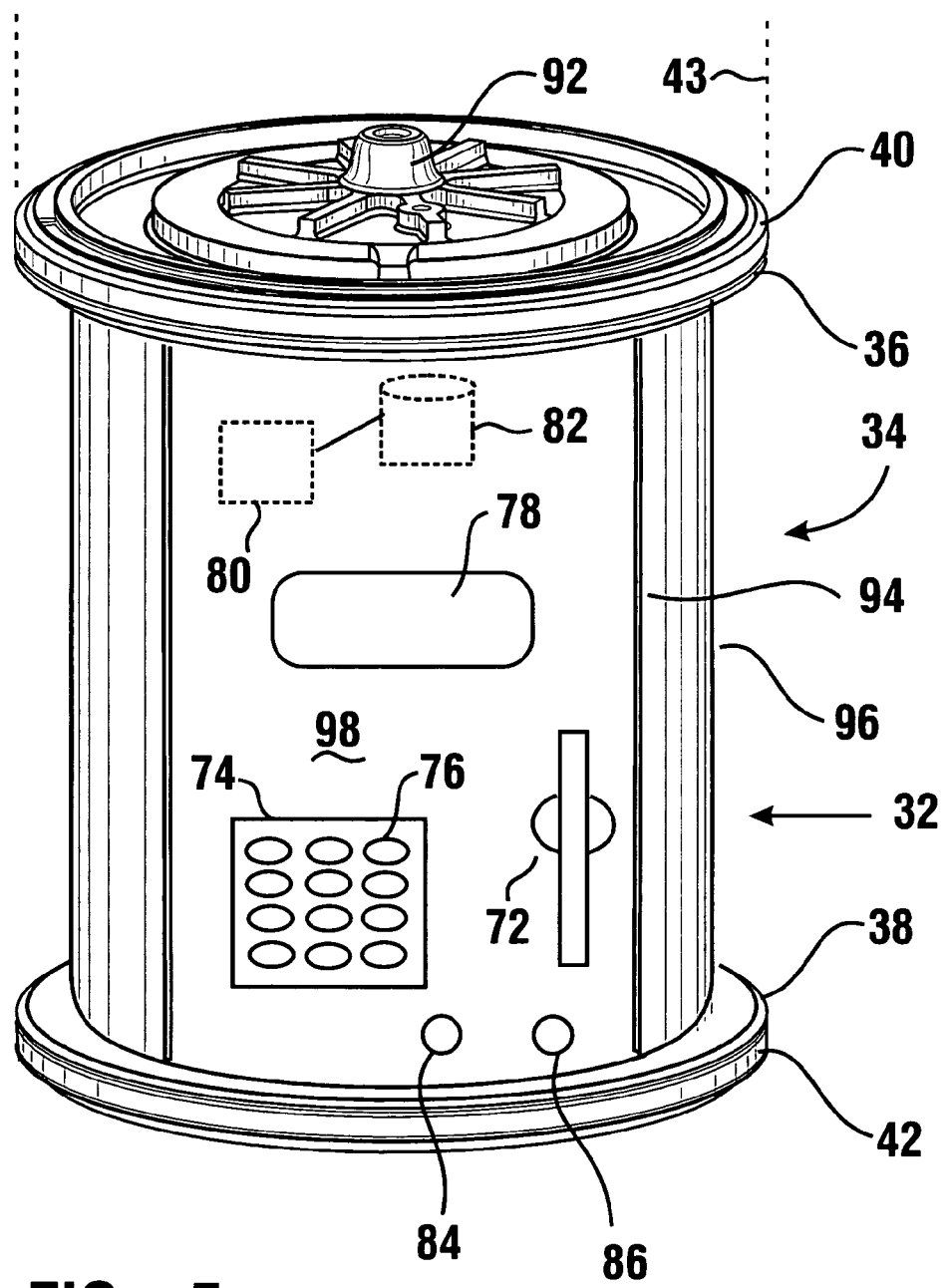
FIG. 5 is an isometric view of an exemplary carrier which may be used in connection with the system shown in FIG. 1.

In an exemplary embodiment, a carrier 32 of the type shown in FIG. 5, is enabled to be selectively moved between the service provider terminal and the customer terminal by the application of differential pressure produced in the tube by blowers 28 and 30. As shown in FIG. 5, the exemplary carrier 32 includes a housing 34. The housing includes a first end member 36 and a second end member 38. The first end member 36 includes an annular resilient seal ring 30 supported thereon. Likewise, second end member 38 has an annular resilient seal ring 42 supported thereon. The seal rings provide slidable and generally fluid tight engagement between the carrier housing and an interior wall of the pneumatic tube as schematically indicated 43 in FIG. 5. The annular seal rings enable the carrier to be moved in the tube through the application of a pressure differential on opposite sides of the carrier.

Figure 2:
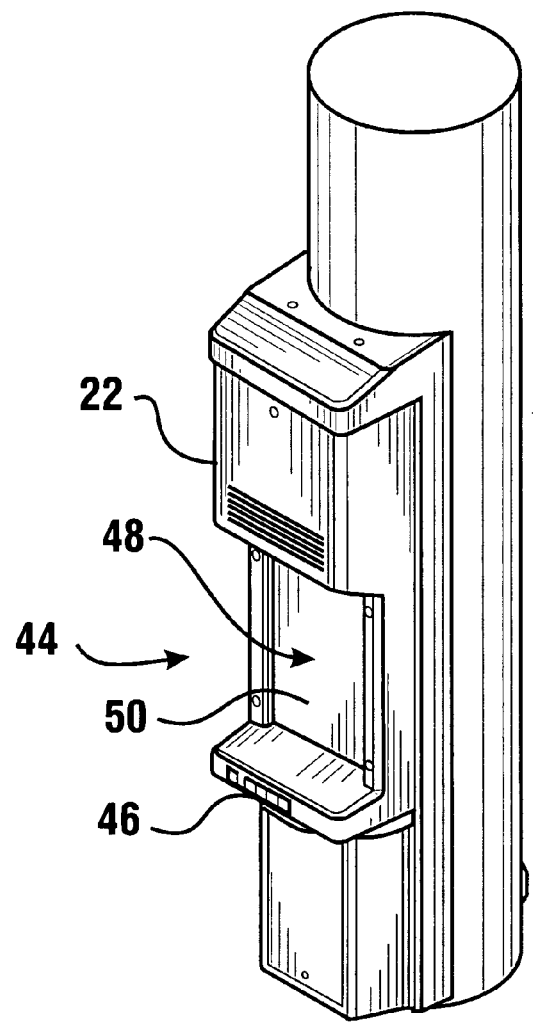
FIG. 2 is an isometric view of a portion of the service provider station as shown in FIG. 1.

FIGS. 2 and 3 show the exemplary service provider terminal 22 in greater detail. The exterior of the service provider terminal includes an interface generally indicated 44 which includes a control panel 46. Control panel 46 serves as a control device includes input devices such as buttons and/or keys, and indicators which are used by a service provider to cause the carrier to move between the service provider station and the customer station, as well as to input other commands. In an exemplary embodiment, the control panel 46 includes a button which may be actuated to apply differential pressure to transfer the carrier from the service provider station to the customer station. Another button included on the control panel may be actuated to apply differential pressure to move the carrier from the customer station to the service provider station.

In an exemplary embodiment, the customer and service provider stations include an audio interface which includes a microphone and speaker at each of the service provider and customer stations. This enables a service provider to audibly communicate with the customers. Buttons or similar devices on the control panel 46 may be selectively actuated by the service provider to enable the service provider to speak to and/or listen to a customer at the customer station.

The exemplary control panel 46 of the service provider station may further include indicator lights or other devices for providing the service provider with information concerning the status of components in the system. Alternative embodiments may include additional devices for communicating with customers. These may include, for example, video communication devices or other devices for facilitating communication between the customer and the service provider.

The exemplary service provider terminal 22 further includes a transfer opening 48. The transfer opening extends through the transfer conduit and enables access to the carrier 32. In the exemplary embodiment, the service provider is enabled to place items to be transferred to a customer into an interior area of the carrier when the carrier is positioned at the service provider station. In an exemplary embodiment, the items to be transferred include pharmacy items, such as medical items, instruction booklets, currency, credit card vouchers, receipts, prescriptions and other documents and things that are exchanged in performing a transaction.

In the exemplary embodiment, the transfer opening 48 includes a door 50. Door 50 is a sliding type door that is movable up and down so as to selectively cover or enable access to the carrier through transfer opening 48. The door 50 is selectively moved between its respective positions by a door moving mechanism (not shown). The door moving mechanism controls the opening and closing of the door 50 at appropriate times and responsive to the control circuitry of the system. The exemplary service provider station as well as the customer station may further include features of U.S. Pat. Nos. 6,146,057 and/or 5,299,891 the disclosures of which are incorporated herein by reference. Similarly, the customer station 14 includes appropriate mechanisms to enable a customer positioned at the customer station adjacent to the customer terminal 24 to access the carrier 32 when the carrier is positioned thereto.

Figure 4:
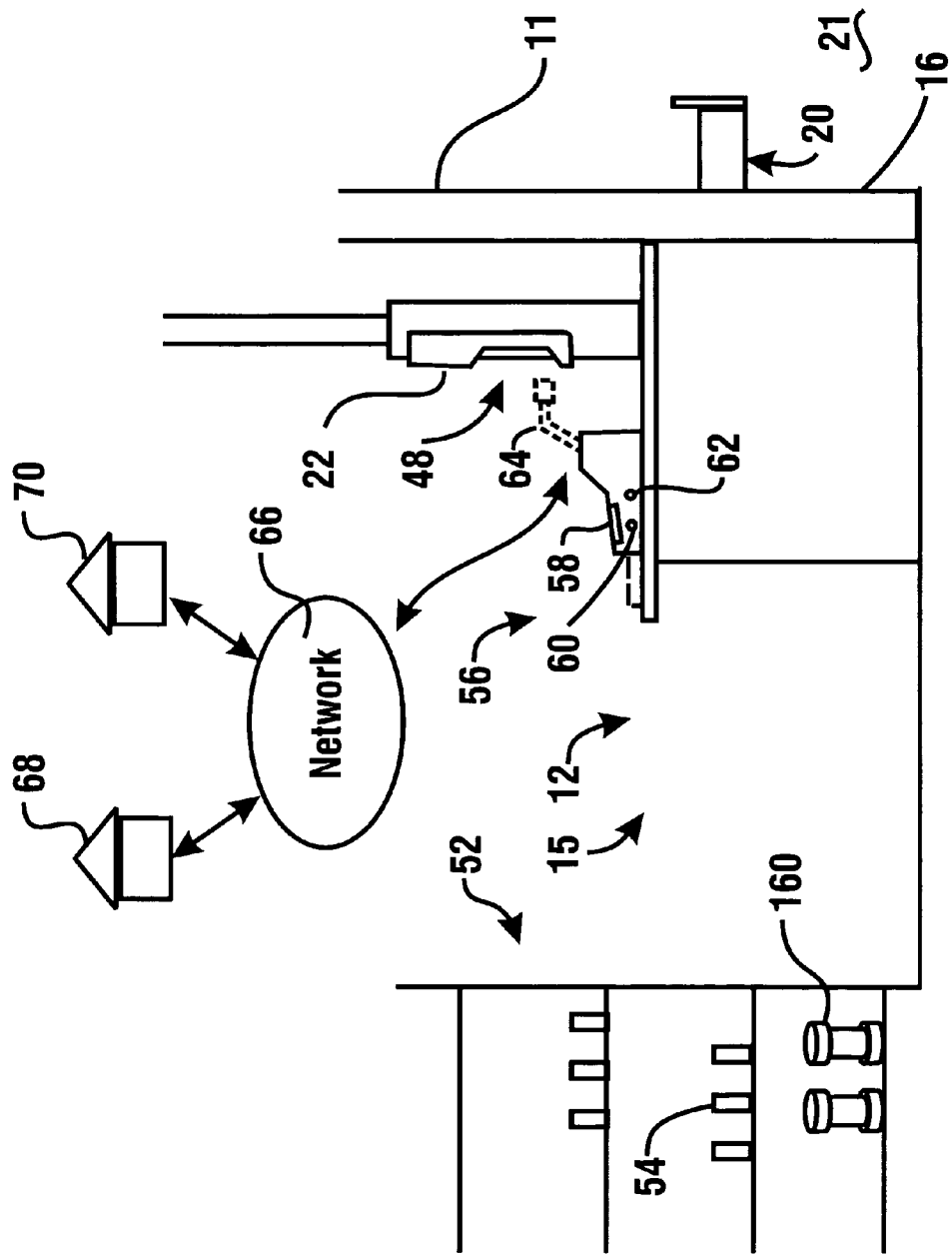
FIG. 4 is a schematic view of the service provider station and the transaction networks connected thereto for purposes of assessing charges against customers' accounts.

FIG. 4 shows an exemplary service provider station which is positioned adjacent to a pharmacy which is schematically indicated 52. Pharmacy 52 includes items schematically indicated 54 which are purchased by customers and delivered to customers at the customer stations through the pneumatic tube or the movable drawer mechanism.

An exemplary service provider station further includes a charge device 56. In exemplary embodiments the charge device may include a cash register, POS terminal or other device that can be used to cause a charge to be assessed to a customer's account. In the exemplary embodiment, the charge device 56 includes an amount input device 58. The amount input device 58 includes input devices, for example numerical keys or other types of input devices, that can be used to receive inputs and/or instructions related to amounts to be charged to a user's account.

The exemplary charge device 56 further includes in operative connection therewith, a reading device 60. The exemplary reading device 60 may be used in a manner later described to receive signals corresponding to data on coded records, that are output from an output device on the carrier or other body. The exemplary charge device further includes a further output device 62. Output device 62 in the exemplary embodiment, may be used to provide an output in the manner later discussed so as to indicate the status of certain transaction steps which may cause actions to be taken, for example to erase information stored in memory on the carrier or other body. As indicated in phantom in FIG. 4, an exemplary embodiment of the charge device may include a selectively positionable input/output device 64. The input/output device 64 may include the functions of the reading device 60 and 62. In exemplary embodiments where the carrier 32 is held captive within the pneumatic transfer tube conduit, the input/output device 64 may be selectively positioned adjacent to the transfer opening 48 so as to achieve communication with the processor and memory supported on the carrier. Alternatively in some embodiments the service provider station may include a card reading device. The card reading device may include a device that reads data encoded on magnetic stripe cards. Alternatively the reading device may read data wirelessly from cards, such as from radio frequency identifier (RFiD) type cards. Of course these approaches are exemplary.

As shown in FIG. 4 the charge device 56 may also be in operative connection with one or more remote computers that can assess charges to customers' accounts responsive to data read from cards that corresponds to financial accounts. Such communication may be achieved through a network schematically indicated 66. Communication may be achieved in some embodiments responsive to manual inputs through at least one input device at the service provider station. Network 66 may be comprised of a single network or multiple connected networks. Network 66 enables communication with entities that can assess a charge to a debit account such as an account of a customer at a bank schematically indicated 68. Alternatively or in addition, network 66 may enable communication with a credit charge processing entity 70, such as an entity associated with VISA® or MasterCard®. Of course this arrangement for assessing charges against customers' accounts is exemplary and in other embodiments other approaches and system configurations may be used.

As shown in FIG. 5, the exemplary carrier 32 includes a body 96. Body 96 bounds an interior area of the carrier which is adapted for holding items that are transferred between customers and the service provider. In the exemplary embodiment, body 96 has an opening 94. Opening 94 provides access to the interior area of the carrier. A movable cover 98 is selectively positionable so as to block access to the interior area through the opening or to enable access thereto. Movable cover 98 is movable through rotation of an end cap 92 in the manner described in the incorporated disclosure.

In the exemplary embodiment carrier 32 serves as a data transfer unit for transferring account and/or user identifying information between a customer and a service provider. In the exemplary embodiment the carrier enables card, PIN and/or other data to be provided by the customer at the customer station, and then to have such data delivered to the charge device at the service provider station.

The exemplary carrier 32 includes a card reader 72 in supporting connection with the movable cover. In the exemplary embodiment the card reader 72 is adapted to receive a magnetic stripe card therein. The card reader receives a card of a customer into a slot and is operative to read magnetic stripe data from the card as the card is either inserted and/or withdrawn from the card reader slot. Of course in other embodiments other types of card readers, such as contactless reading devices, may be used.

Carrier 32 further includes in supporting connection with the movable cover 98, a recessed keypad 74. Keypad 74 includes a plurality of keys 76. In the exemplary embodiment keys 76 are alphanumeric keys which facilitate the input of a PIN or other data or instructions by the customer.

In the exemplary embodiment the movable cover 98 further includes an output device 78 which comprises a display. Display 78 in the exemplary embodiment includes an LCD type display which is enabled to output alphanumeric data to a user. It should be understood however that the input and output devices shown on the carrier 32 are exemplary and in other embodiments other or additional types of input and/or output devices may be used.

Carrier 32 further has in supporting connection therewith a processor schematically indicated 80. Processor 80 includes the capability to process instructions so as to carry out the functions later described. Processor 80 is in operative connection with a memory schematically indicated 82. Memory 82 is operative to hold instructions to be executed by the processor as well as other data as hereafter described.

Carrier 32 of the exemplary embodiment further includes an output device 84. In the exemplary embodiment output device 84 provides outputs in the form of signals. In the exemplary embodiment the signals are infrared signals. It should be understood however that in other embodiments other types of output devices may be used, including other types of radiation emitting devices including devices such as LEDs or RF output devices. Other output devices used in embodiments may include (but are not limited to) electrical connectors, displays, RF backscatter devices, sonic output devices or other types of devices which are operative to output or otherwise provide signals.

In the exemplary embodiment, carrier 32 further includes a reading device 86. Reading device 86 is operative to receive signals from the output device 62 of the charge device in the manner earlier explained. The output device 84 and the reading device 86 are also in operative connection with the processor 80 and the memory 82.

It should be understood that although in the embodiment shown in FIG. 5 the carrier body is integrally formed with the transaction data transfer terminal, in other embodiments other types of data transfer devices may be used. For example a body may be provided which is separable from the carrier so as to enable the body to be removed from the pneumatic transfer apparatus. In further alternative embodiments a carrier may be removable from the pneumatic transfer conduit such that the carrier may be used for data transfer, and a different carrier placed in the conduit and used to transport items between the service provider and the customer. Of course numerous alternative approaches may be used.

Figure 8:
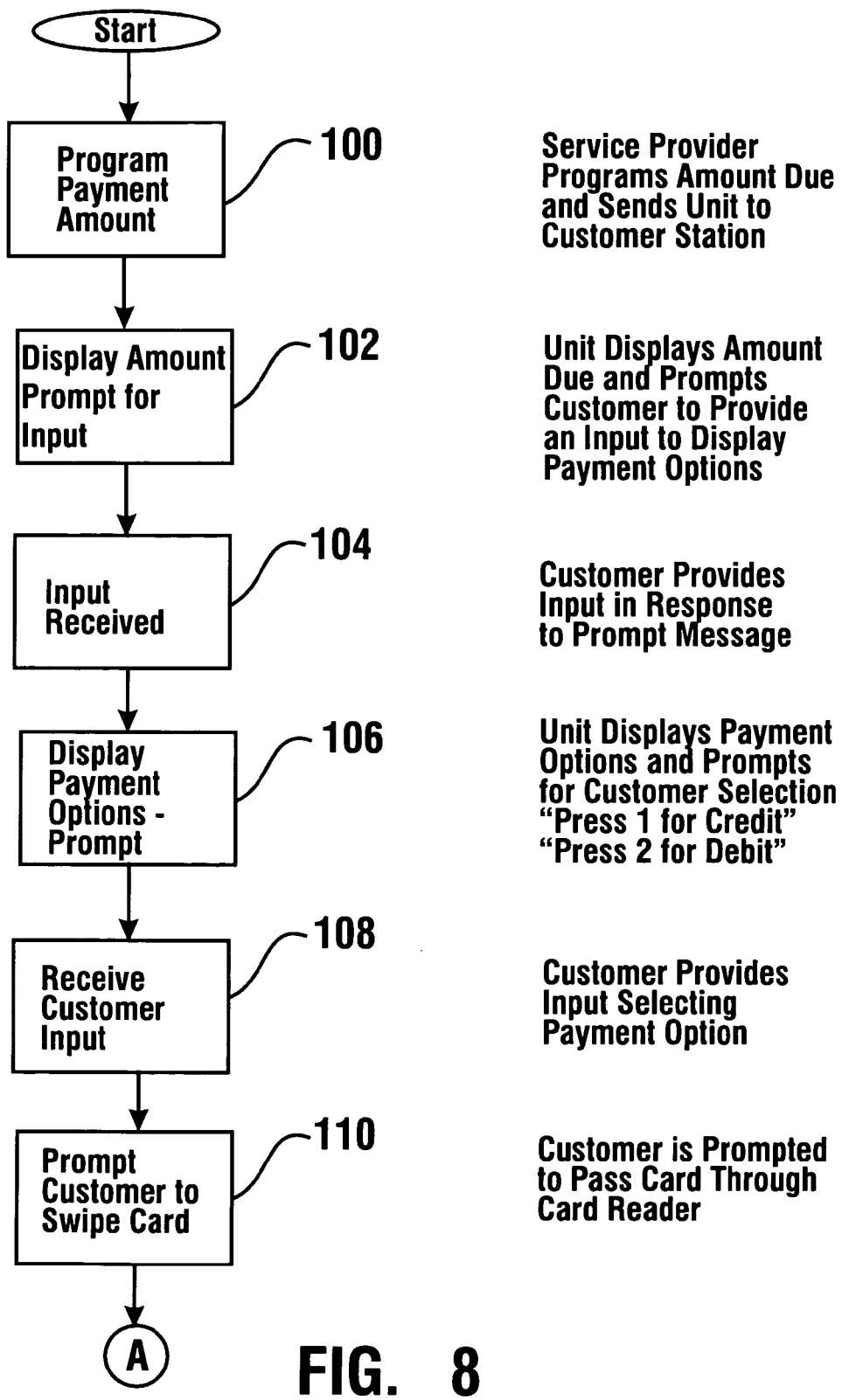
FIGS. 8 through 10 are schematic views of transaction steps which are conducted through operation of the transaction transfer unit of an exemplary embodiment.
Figure 9:
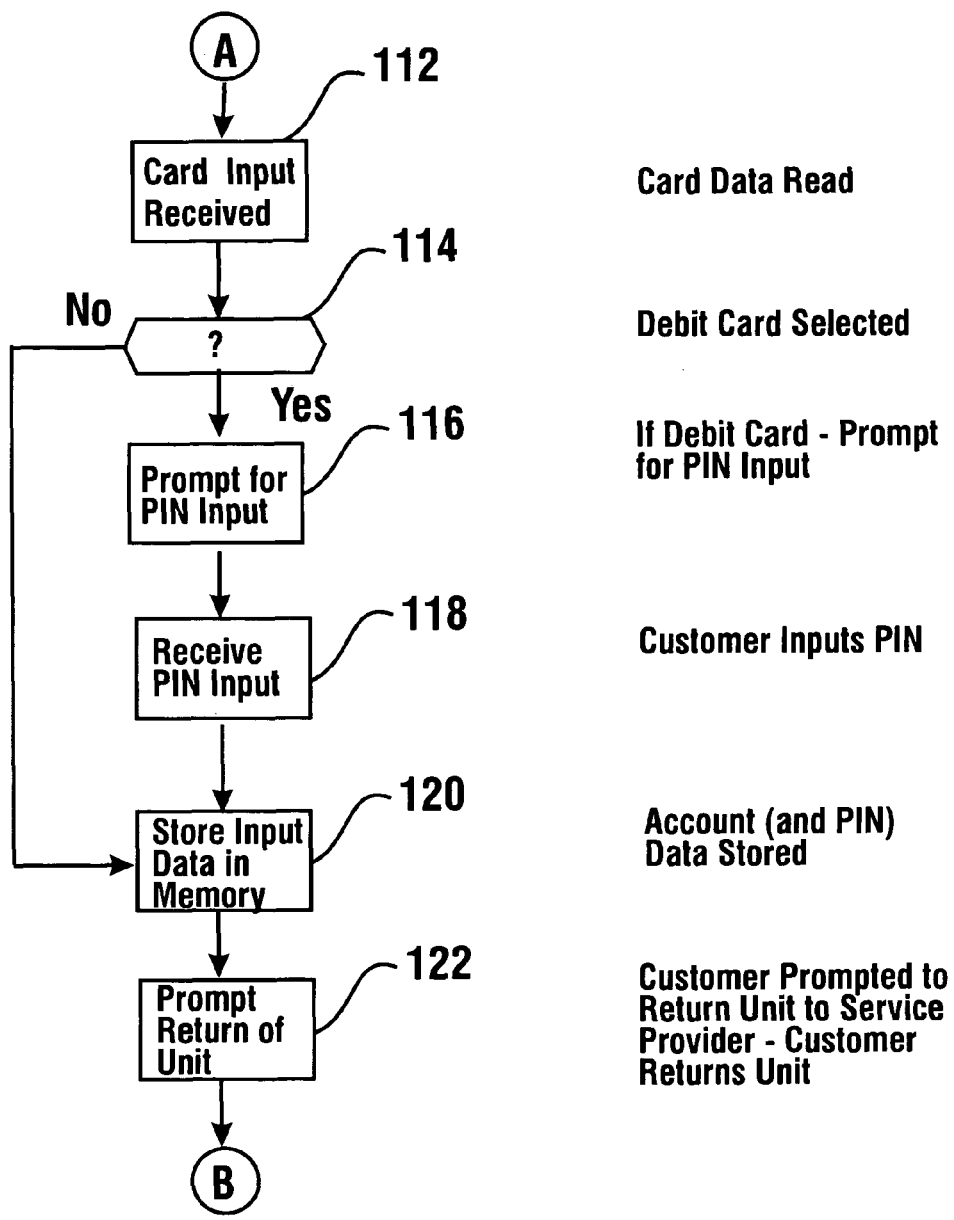

Operation of an exemplary system for purposes of carrying out a transaction between a service provider and a customer will now be explained with reference to FIGS. 8 through 10. In the exemplary embodiment the service provider receives requests from the customer at the customer station, such as a request to purchase items. In the exemplary embodiment these would be pharmacy items 54 which have an associated charge. The customer may provide documents, prescriptions or other information to the service provider. This may be done by transporting these items in the interior area of the carrier, by providing information through the communication system provided between the customer station and service provider station, or combinations thereof. The items requested by the customer will have an associated charge. This charge can be calculated either by the service provider or through use of the amount input device on the charge device or other input mechanisms.

In this exemplary embodiment if the customer indicates to the service provider that they wish to charge their debit or credit card account for the items to be delivered, the service provider operates the charge device 56 through appropriate inputs, to program the amount the customer is to pay into the carrier 32. This is reflected by a step 100 shown in FIG. 8. In the exemplary embodiment the programming of the amount information into the memory 82 of the carrier is accomplished by the transmission of signals from the output device 62 (or with the combined input and output device 64) which are received by the reading device 86. Once the amount to be paid is programmed into the memory of the carrier, the service provider provides appropriate inputs at the service provider's station to cause the carrier to be transmitted to the customer station.

At the customer station the exemplary processor 80 operates to cause the amount due from the customer to be output through the display 78. The processor also operates in response to programmed instructions in memory to output a prompt through the display for the customer to provide an input so as to display and eventually select their payment options. This is indicated by a step 102. The customer then provides the requested input in response to the prompt indicated by step 104. The input may be for example, the customer touching one or more keys 76 of the keypad.

In response to input received from the customer in step 104 the processor is operative to cause the display 78 to output payment options for the user. This is represented by a step 106. The output payment options may include for example prompting the customer to press 1 for a credit transaction and to press 2 for a debit transaction. The customer then provides a selected input as represented by step 108.

In response to the customer providing the payment option selection, the processor is operative to cause the display 78 to output a prompt requesting that the user swipe their card through the card reader 72. This is represented by step 110. The input by the user from their card through the card reader causes data to be read from the magnetic stripe of the card as represented by step 112 in FIG. 9. The processor then operates in accordance with its programmed instructions to determine if it was a debit or credit card transaction that the customer selected. This is represented in step 114. If the customer has requested a debit card transaction, the processor operates to provide an output prompting the customer to input their PIN as indicated in step 116. When the PIN data is received as reflected in step 118, the processor then operates to cause the card and PIN data to be stored in the memory on the carrier as reflected in step 120. Of course as schematically indicated in FIG. 9, if the customer has requested a credit card transaction which does not require PIN data, only the card data is stored.

It should be understood that in other embodiments data may be read from other coded records. This may include, for example, reading data wirelessly from contactless cards. In some embodiments such data may be captured through operation of a wireless code reading device in the carrier. Of course these approaches are exemplary.

Upon receiving the data from the customer necessary to assess a charge against the customer's selected account, the processor operates in accordance with its instructions to provide an output through a display 78 prompting the user to return the carrier to the service provider station. This is represented in FIG. 9 by a step 122. In response to a prompt, the customer in some embodiments may cause the carrier to be transferred to the service provider station through one or more inputs to input devices at the customer terminal. Alternatively the customer may notify the service provider that they are ready to send the carrier and the service provider may provide the inputs necessary to transfer the carrier to the service provider terminal. It should be further understood that in some embodiments the processor may operate in accordance with its programming to provide additional steps and functions such as to request that the customer retry the card reading steps and/or PIN entry steps in cases where the data has not been properly received or stored, or in cases where the customer indicates that they have made an error.

Figure 10:
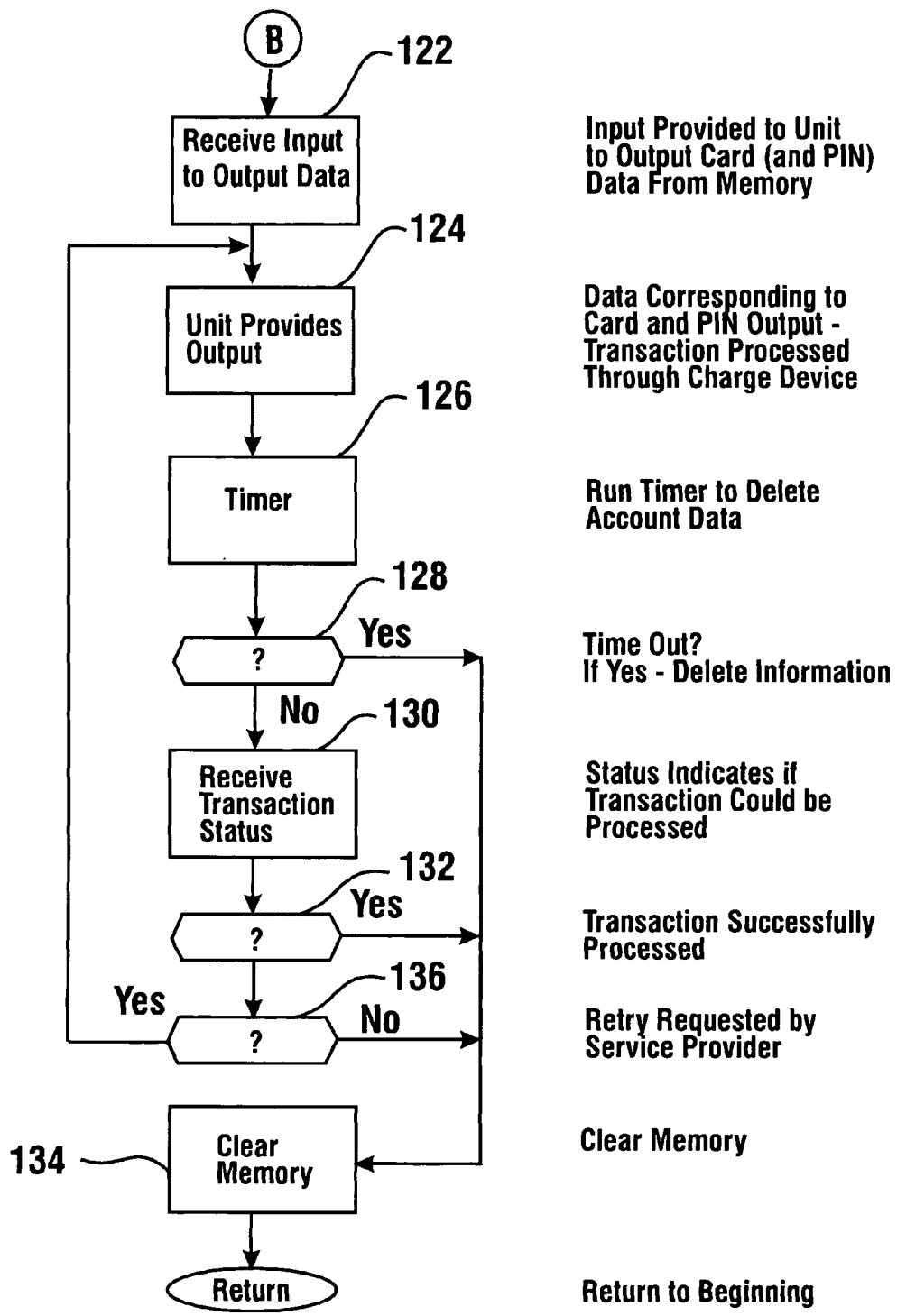

As represented in FIG. 10 with the carrier returned to the service provider station, the service provider through operation of the charge device 56 provides at least one input to the reading device 86 on the carrier. This is done by the transmission of signals to the output device 62 and/or through the combined input/output device 64. This input is operative to notify the processor on the carrier that the data stored in memory necessary to process the transaction, is to be output. This is represented by a step 124.

As indicated in step 126, the carrier then outputs through the output device 84, signals corresponding to the data stored in memory. This data includes card data and, if appropriate, PIN data. The data output through the output device 84 is received by the reading device 60 of the charge device and/or by the combined input/output device 64.

In response to receiving the data stored in memory of the carrier, the charge device is operative to cause a charge to be assessed against the user's account. In the exemplary embodiment the charge device is operative responsive to at least one input through an input device by the service provider to cause appropriate messages to be sent through the network 66 to the entity that can assess the charge against the user's selected account. The appropriate charge assessing entity through operation of its computer systems generally responds to the charge device with appropriate messages indicating that the charge is acceptable against the requested account. Of course if the charge is not authorized, then one or more messages indicative of this situation is sent through the network to the service provider. In the exemplary embodiment the service provider is notified whether or not the charge is acceptable through outputs provided through one or more output devices on the charge device 58. These may be outputs provided, for example, through a display on a point of sale terminal, electronic cash register, card authorization terminal or other apparatus integral with or connected to the devices used to communicate the messages to assess the charge against the user's account.

In the exemplary embodiment when the carrier outputs the data corresponding to the customer's account information, a timer is run and reflected in a step 126. This is done in the exemplary embodiment so that the data input by the customer is eventually automatically erased from the memory of the carrier unit. This reduces the risk that unauthorized access to this information will be obtained. If the preset time elapses without further action as indicated in a step 128, such data in the memory 82 on the carrier is erased.

In the exemplary embodiment an output is provided through the output device 62 of the charge device or through the combined input/output device 64, to indicate to the processor on the carrier whether the transaction could be successfully processed. This is indicated in a step 130. As indicated in step 132, if the transaction was successfully processed, the processor operates to clear the memory of the customer's data as indicated in step 134. Alternatively if the transaction could not be successfully processed, but the service provider chooses to resubmit the transaction, the service provider may through the charge device cause the carrier to output the transaction data again as reflected at a step 136. As FIG. 10 indicates however, the carrier will output the transaction data a second time only if the timing function has not caused the data in memory to be automatically erased. If the service provider chooses not to retry the requested transaction in step 136, the customer transaction data stored in memory on the carrier is erased. This readies the carrier to receive new charge account data from either the same or another customer.

If the charge is successfully assessed to the customer's account, the service provider in the exemplary embodiment will provide inputs to the service provider terminal so as to open the movable cover 98 on the carrier. The service provider will then place the items that have been purchased by the customer in the interior area of the carrier and provide inputs to close the movable cover. Further inputs provided by the service provider to the control device of service provider terminal will operate the blower so as to cause the carrier to be transported to the customer station. Once at the customer station the cover will be opened such that the customer may access the items as well as receipts, instructions, promotional material or any other things which the service provider has placed in the interior area of the carrier for delivery to the customer. After the items have been taken by the customer, the customer will generally leave the customer station and the service provider is ready to service another customer.

Figure 6:
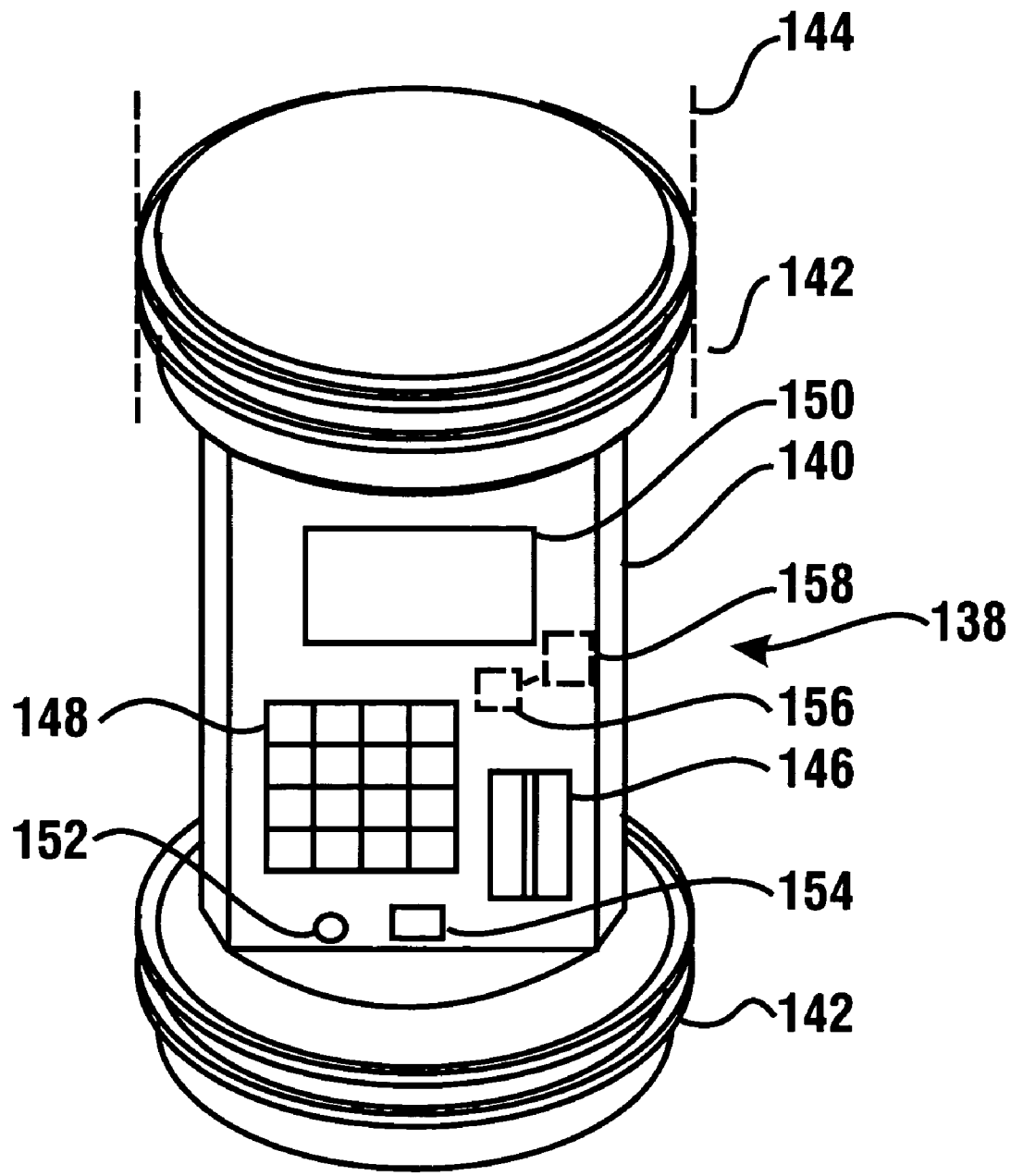
FIG. 6 is an isometric view of an alternative type carrier with an integral transaction data storage unit, which may be used in some embodiments.

Other alternative exemplary embodiments may include types of pneumatic transfer systems in which the carrier, which is transported between the service provider station and the customer station, may be removed from the transfer conduit. FIG. 6 shows an exemplary data transfer unit schematically indicated 138 which may be used in such an embodiment. Unit 138 includes a body 140. Body 140 includes annular seal rings 142 adjacent each end which enable slidable generally fluid tight engagement with the interior wall of a transfer tube which is schematically represented 144. Body 144 has in supporting connection therewith a card reader 146 and a keypad 148 including a plurality of keys. Body 140 also includes a display 150, an output device 152 and a reading device 154. Body 140 also has supported thereon a processor schematically indicated 156. The processor 156 is in operative connection with a memory schematically indicated 158.

The operation of the system which includes the unit 138 is generally similar to that previously described. The unit may be programmed with the amount due by the service provider at the service provider station through operation of the charge device. This can be accomplished for example, through the output device 62 delivering signals to the reading device 154 which indicates the charge amount. These may be for example, infrared signals or other types of radiation signals. Of course as previously discussed, other types of electrical or electronic signals including physical electrical connections may be used.

Once programmed with the amount data, the unit 138 may be placed in the transfer tube and transferred to the customer station. Because the customer is enabled to remove the unit from the transfer tube, the customer does not have to extend themselves through a window of their vehicle to swipe their card and/or provide a PIN input, or input other data to the unit. Rather, the customer may provide the necessary inputs within the confines of their vehicle in the drive-through lane adjacent to the customer station.

Once programmed with the information, the unit 138 may then be placed in the customer terminal by the customer and transported to the service provider terminal. At the service provider station, the service provider may remove the unit from the tube and receive the account information from the output device 152 so as to assess the charge to the customer's account in the manner previously discussed. The successful assessment of the charge may also cause the charge device to output signals which are received by the carrier so as to erase the customer information from the memory.

In this alternative embodiment, because the carrier is removable from the tube, the service provider may deliver items to the customer through use of an alternative carrier. Such an alternative carrier is schematically indicated 160 in FIG. 4. The carrier 160 may be similar in configuration to the unit 138 but may include an interior area in which items may be stored and transferred between the customer and the service provider. As a result, the exemplary systems including the unit 138 may employ carriers only intended for transferring items in transactions where it is not necessary to receive account data from the customer. In those transactions where it is necessary to receive debit or credit card data, the other carrier may be removed from the system by the service provider and the unit 138 used to transfer the necessary account data. Of course it should be understood that unit 138 and its method of use are exemplary and in other embodiments other approaches may be used.

Figure 7:
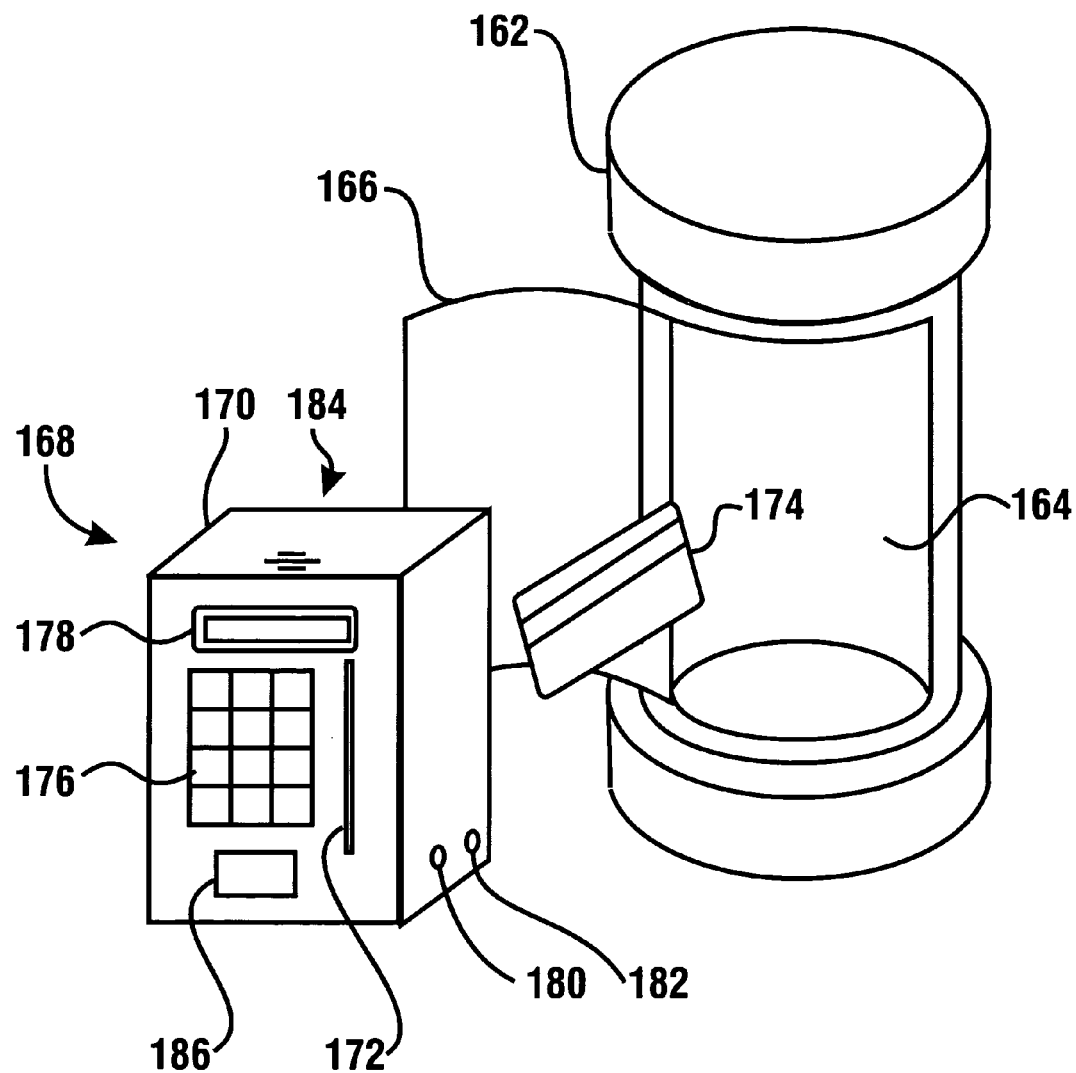
FIG. 7 is an isometric view of an alternative embodiment of a carrier and transaction data transfer unit that may be removably positioned in an interior area of a carrier or in an alternative device for transferring the unit between a customer and a service provider, such as a movable drawer.

FIG. 7 shows yet a further alternative embodiment of a data transfer unit which may be used to deliver account information from the customer to the service provider. FIG. 7 shows a carrier 162 of a type that is removable from the transfer conduit. Carrier 162 includes an interior area 164. Access to interior area 164 is controlled by removable cover 166.

A data transfer unit 168 is removably positionable in the interior area 164. In this embodiment the data transfer unit may be moved between the service provider and the customer in a manner similar to other items that are exchanged between the service provider and the customer. Unit 168 includes a body 170 sized to be removably positioned in the interior area 164. Body 170 includes in supporting connection therewith a card reader schematically indicated 172 for reading cards such as card 174 as shown. It should be understood that although card 174 shown is a magnetic stripe card, other embodiments may be capable of reading other types of coded records, such as smart cards, contactless cards or other types of cards which include account information or data representative of monetary value. Unit 168 further includes a keypad 176 including the plurality of keys and a display 178.

Body 170 also has supported thereon an output device 180 and a reading device 182. It should be understood that body 170 further includes a processor and a memory and may be operated in a manner similar to that described in connection with other embodiments.

Alternative embodiments may also include other types of input and output devices in addition to or different from those previously described. For example unit 168 may include audio output devices such as a speaker schematically indicated 184. Such an output device may be useful in providing instructions for operation of the device by persons who are visually impaired. In addition or in the alternative, unit 168 may include a device and appropriate programmed instructions to receive and interpret verbal inputs from users. Alternatively or in addition, unit 168 may include a device for reading biometric indicia such as fingerprint reader 186. In some embodiments biometric indicia may be received for purposes of identifying a particular user and/or their account. Such information may be received and stored by the unit and transferred to the charge device or other device at the service provider station. Such information may be used to verify that the transaction is authorized or that the user is a person who is authorized to charge amounts against a particular account. Alternatively or in addition, biometric inputs may be compared to data stored on a card or in other local or remote memory for purposes of determining the identity of the particular user and their authority to conduct the transaction. This may be appropriate for example when a user is receiving medical items which are narcotics through the system. In such cases the biometric inputs may be used to further verify that the individual is authorized to receive the narcotics and/or may assist in tracking unauthorized transactions. Further in some embodiments inputs such as biometric inputs or other inputs may be compared to data stored on the user's card for purposes of verifying that the user's card is being used by the authorized user. This data may be stored for example on a memory chip on a card and the verification may be accomplished through the processor in the portable stripe unit. Of course these approaches are merely exemplary.

In other exemplary embodiments, the carrier may operate to provide instructions that enable a user to transfer funds wirelessly. This may be done for example, using features like those described in U.S. Pat. No. 6,702,181, the disclosure of which is incorporated herein by reference.

In still other alternative embodiments the portable unit may include other types of input devices. Such input devices may include for example devices that are operative to receive data from data storage devices. Such data storage devices may include for example media which includes data which has a user's medical information thereon. For example in some embodiments the portable unit may be capable of reading data that is included in an RFID chip that is carried by a user. The RFID chip may contain information about the user as well as their medical history. Such information may be included in the memory of the portable unit. Such data may be received by a pharmacist through an appropriate computer in the pharmacy. The pharmacist may then analyze the information for purposes of attempting to assure that medications or other items being prescribed for use by the person will not initiate allergic reactions that cause undesirable interactions with other medications that the user may be taking. This may be done in some exemplary embodiments through an appropriate programmed computer and database system which analyzes the information concerning the patient and each of the medications or other items that have been prescribed for use by the patient. Alternatively or in addition the computer in the pharmacy may provide visual outputs to the pharmacist that then can be analyzed to minimize the risk of adverse responses and interactions.

In still other exemplary embodiments the at least one computer operated by the pharmacist may be operative to update the information provided through the portable unit to indicate that the user has been prescribed the particular medications. This updated information may be then transmitted back through the portable unit into proximity with the user. An output device on the portable unit may then be operative to update the programming on the portable article carried by the user so as to include the additional information. The portable unit may include appropriate interfaces and output devices to indicate to the user that the data on their portable article is being updated. Various embodiments of the portable unit may include appropriate interfaces for purposes of achieving this communication. This may include for example infrared, radio frequency or other interfaces as is appropriate to communicate with the portable article which includes the user's medical information. For example in some embodiments a wireless programming interface with programming and MD chip memory included on a portable article may be utilized for purposes of updating the user's medical information. Of course these approaches are exemplary and in other embodiments other approaches may be used. For example, the unit may include a reader for reading other types of identifying items indicating how amounts are to be charged. This may include for example, readers for bar codes, RFID or other types of items or signals bearing identifying indicia. As a result the portable unit may be used for reading items such as benefit plan cards or hospital ID bands. Such items may be used to communicate information on how to assess charges, including charges to be assessed to third parties. The information may be transmitted to the charge device and utilized for purposes of assessing appropriate charges, tracking medication use, or other purposes.

The operation of the unit 168 shown in FIG. 7 in connection with the transaction system may be generally similar to that previously described. A further advantage of the unit 168 shown in FIG. 7 is that the unit may also be provided to customers other than by delivery through the pneumatic tube conduit. For example unit 168 may be passed to a customer through the opening in the wall 16 by extending and retracting the movable drawer 20. In this way a customer located at customer station 21 may use the unit 168 to provide card and/or PIN data for purposes of carrying out transactions with the service provider.

In alternative embodiments the carrier or other unit may also serve to perform other functions. For example, memory in the portable unit may be used to hold .wav files or other data that can be used to provide audio outputs. Such audio outputs may be used to provide the user with instructions for use of the items delivered. For example, audio instructions may be associated in a database in the establishment with an item being provided to the user. As a result when the item is indicated as being sold through the charge device, or in response to other inputs such as scanning a bar code on the item, a computer in the establishment operates to cause the data to produce the audio instructions to be loaded into the memory of the portable unit. Thereafter when the user is to receive the items, such as in a carrier, or at another time, the audio instructions may be output through a speaker on the carrier or other connected speaker. Alternatively such instructions may be provided by a pharmacist for the particular user or for the particular items. The pharmacist's instructions may be stored as data and transferred to the memory in the carrier or other unit from which they are output to the user. In some embodiments the processor may be programmed to enable a user after receipt of the instructions to repeat them by providing one or more inputs. Of course these approaches are exemplary and in other embodiments other approaches may be used.

In some alternative embodiments the portable unit may also be utilized to perform other functions. For example, persons may carry medical history data on a card or other device. The portable unit may include a suitable card reader or other input device for receiving such data. Such information may be transmitted to the provider of the item who can input such data into a computer system that looks for allergies or possible instructions with the items currently being provided to the user. In this way the provider of the item can reduce the risks of such problems with the items being provided. Additionally, the portable unit may include the capability for delivering data to supplement medical data on a card or other item bearing medical information about the user. For example the portable unit may be programmed to update the data stored on a user's medical history card. The user may update the data through a writer device on the portable unit by engaging the user's medical history card therewith. Alternatively, in some exemplary embodiments such data may be delivered to a device that is capable of wireless communication, such as a user's portable phone. The phone may receive the data via infrared, Bluetooth or other wireless signals. A processor in the phone may then operate in accordance with its programming to cause the phone to contact a remote computer operatively connected with a database including medical information associated with the user of the phone. The remote computer may operate to determine data corresponding to any potential adverse consequences for the user associated with the medical item being provided to the user and also update the database information. In some embodiments the at least one computer may operate to provide warnings to the user through the phone of potential adverse consequences associated with the medical item. This may be done for example, by an electronic voice or text message. Of course these approaches are exemplary, and in other embodiments other approaches may be used.

Figure 11:
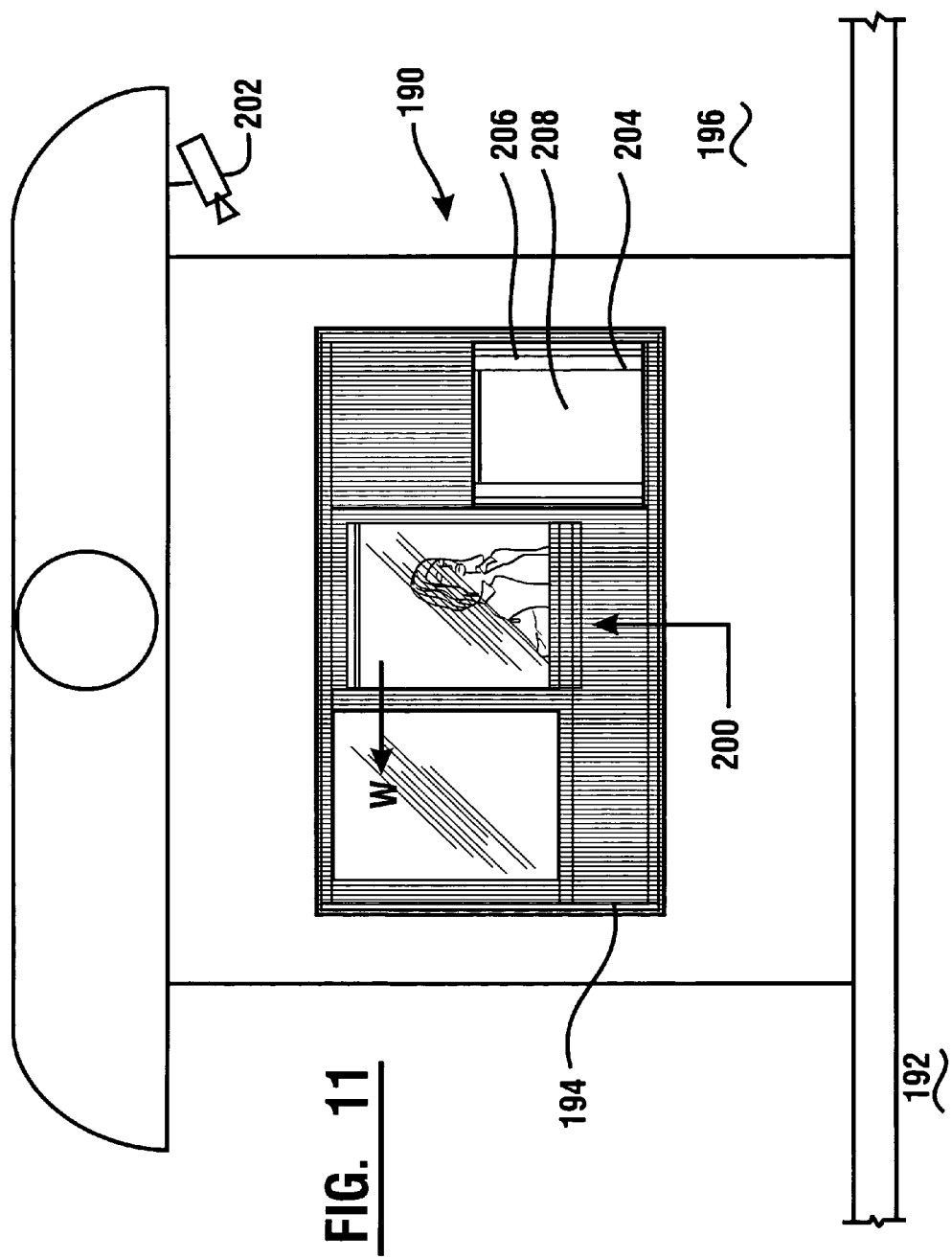
FIG. 11 is an external elevational view of an alternative service provider station.
Figure 12:
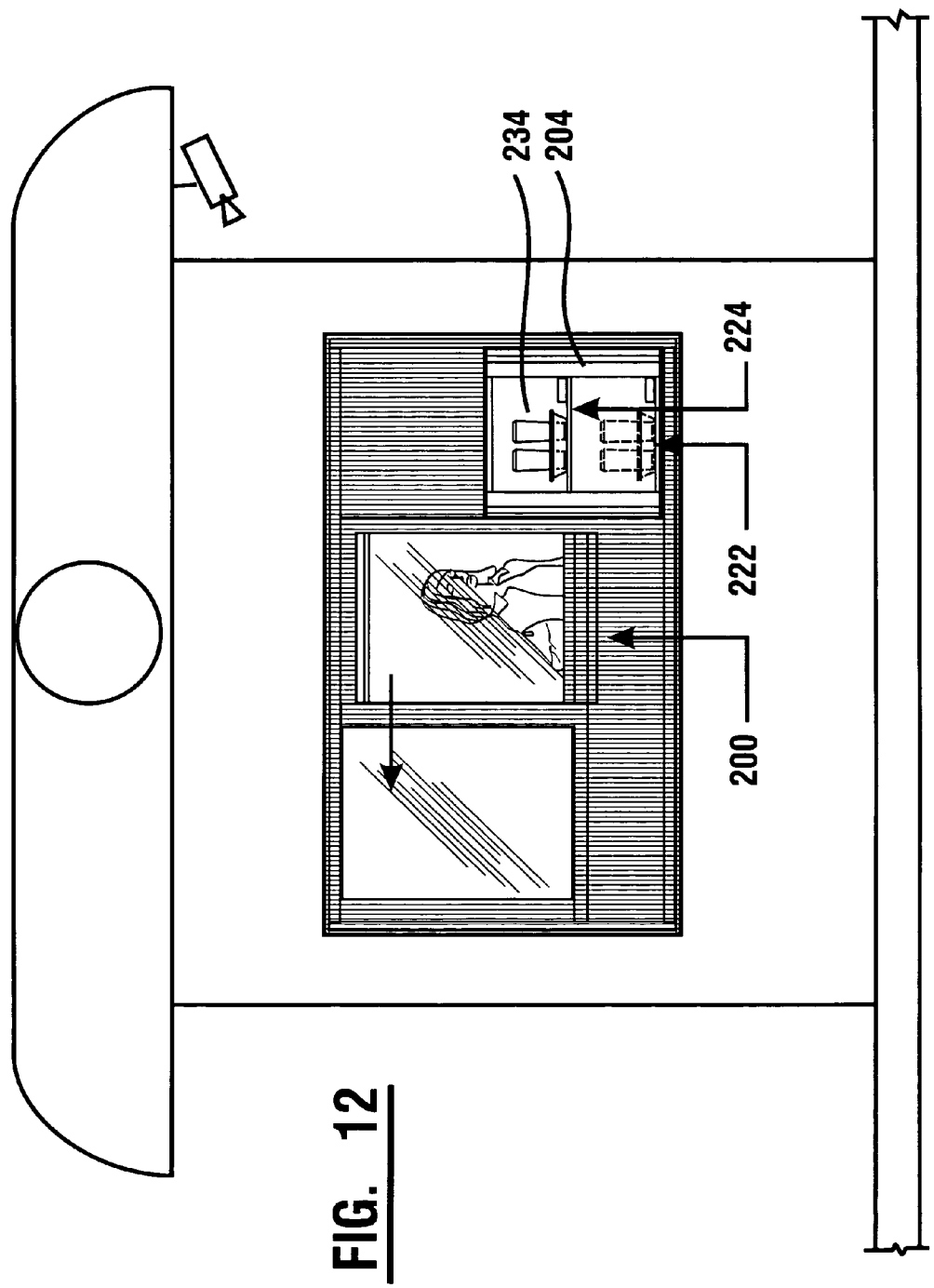
FIG. 12 is a view of the service provider station similar to FIG. 11 but with the customer delivery stations of the service provider station shown in a customer accessible position.

FIGS. 11 through 17 disclose alternative transaction systems for use in exemplary embodiments. These transaction systems may include devices and features of those previously described, or other devices, elements, features and relationships. FIG. 11 shows an exterior view of an exemplary service provider station 190. Service provider station 190 of the exemplary embodiment is positioned adjacent to a drive-through lane 192. Drive-through lane 192 of the exemplary embodiment is a passage through which customers may pass the service provider station in vehicles. It should be understood that although the exemplary embodiment is described as being used in conjunction with a drive-through lane, other embodiments may be used in other transaction environments such as a walk-up environment.

Figure 13:
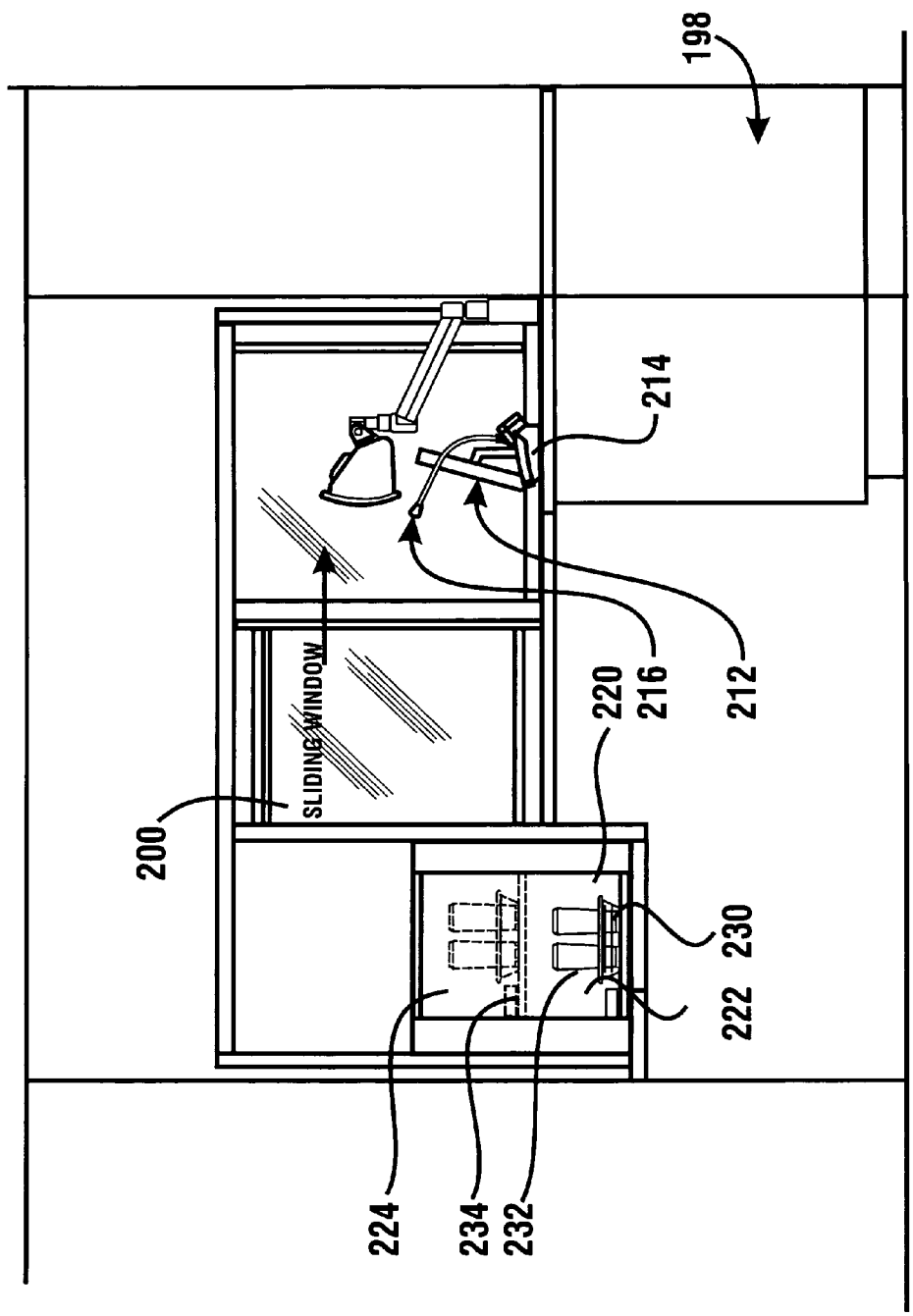
FIG. 13 is an interior elevational view of the exemplary customer station.

The exemplary embodiment of the service provider station includes a wall 194. Wall 194 is operative to separate an exterior area generally indicated 196 from an interior area 198 of the service provider station as shown in FIG. 13. The exemplary service provider station includes at least one customer observation device. The observation device may include a window 200 through which the service provider can view customers in their vehicles in the drive-through lane. In the exemplary embodiment the window 200 may be opened by the service provider from the inside. The service provider is enabled to open the window by moving it in the direction of Arrow W as shown. This enables the service provider in the exemplary embodiment to reach through the window and exchange items with the customer. Further in the exemplary embodiment a further observation device is provided which includes a camera 202. Camera 202 enables a service provider to observe customers at the service provider station through a display or other suitable output device. It should be understood that in some embodiments only one form of user observation device may be used. For example in some embodiments it may be preferable to use a camera which enables the service provider to view the customer and which prevents the customers from observing the service provider in the interior area of the service provider station. This may provide benefits in avoiding the risk of robbery or harm to the service provider. Of course this approach is exemplary and in other embodiments other approaches may be used.

In the exemplary embodiment of the service provider station, the wall 194 includes an opening 204. Opening 204 has a delivery device 206 therein. The exemplary embodiment of the delivery device is operative to enable the exchange of items between the customer and the service provider. In the position of the delivery device shown, a plate section 208 is directed toward the drive-through lane. The plate section 208 is positioned in the opening 204 when it is desirable to prevent customers from accessing the delivery stations of the delivery device from the exterior area outside the wall.

Figure 15:
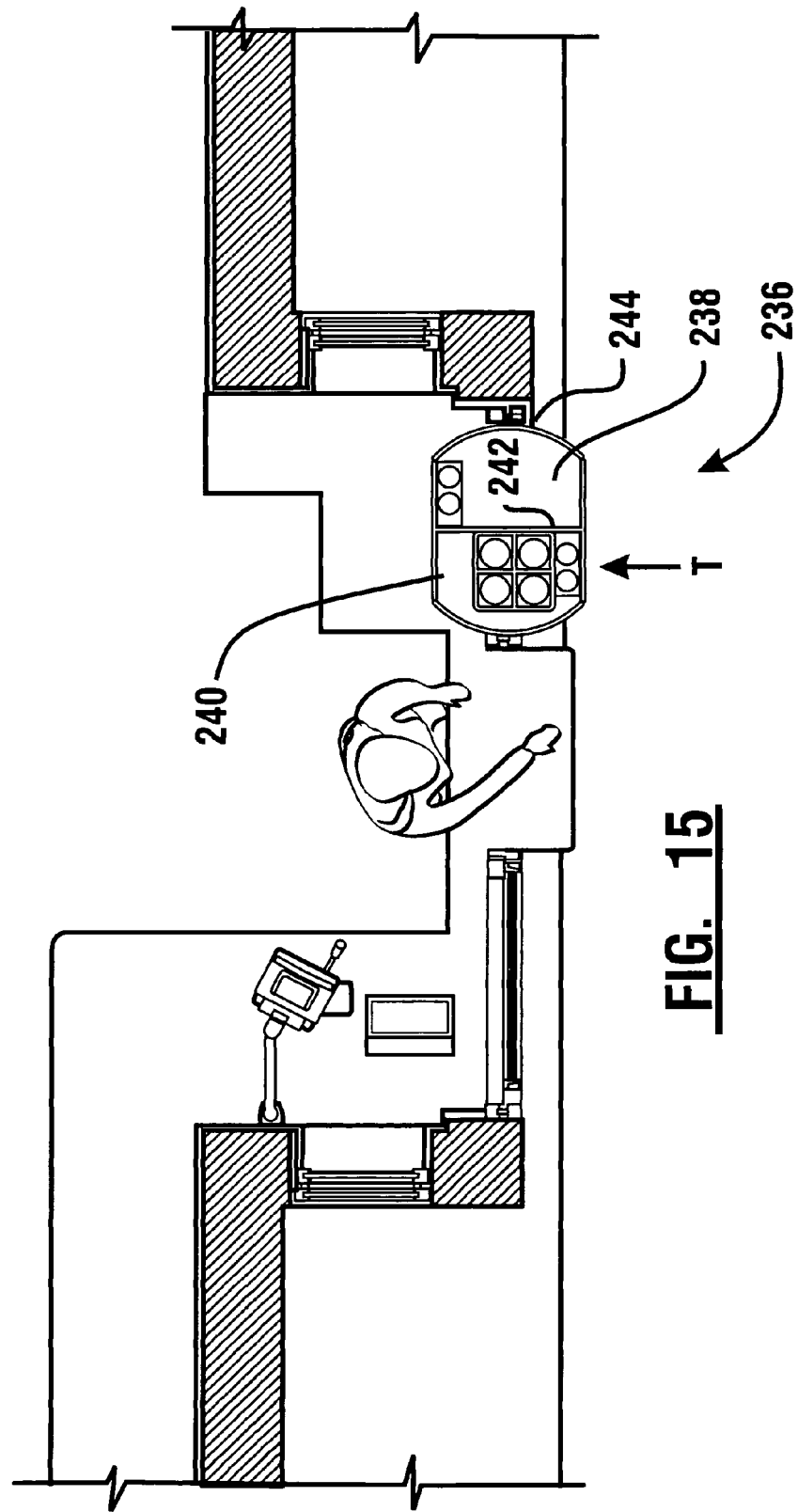
FIG. 15 is a top sectional view of an alternative service provider station including an alternative device including customer delivery stations.

As shown in greater detail in FIGS. 13 and 15, the interior area 198 includes the service provider station at which a service provider is positioned. The service provider station of the exemplary embodiment includes an output device 210 such as a video display. The video display may be used to receive images, such as those provided by the camera 202. Alternatively or in addition, the output device may be used to receive transaction information related to transactions being conducted by the service provider. Of course these approaches are exemplary.

The service provider station further includes in the interior area a transaction processing terminal 212. The transaction processing terminal may perform various functions depending on the transaction environment in which the service provider station is used. For example in a pharmacy environment like that previously discussed, the transaction processing terminal may include one or more terminals that process purchasing transactions of the type carried out for customers. Alternatively or in addition, the transaction processing terminal may include capabilities for checking prescriptions, analyzing data or performing other activities as is appropriate for purposes of fulfilling drive-through pharmacy transactions. In a banking transaction environment the transaction processing terminal may be operative to enable the processing of banking transactions for users. Such transactions may include the processing of deposits, withdrawals, funds transfers, passbook updates with other transaction requests as may be requested by users. In other exemplary embodiments the transaction processing terminal may be used for submitting orders, receiving customer information, processing payments or doing other transaction activities as may be appropriate for the particular transaction environment. Of course these approaches are exemplary.

The exemplary embodiment of the service provider station includes a device for reading data included on coded records. Such a device may include a card reader that is operative to read data included on magnetic stripe cards. Such cards may be read through actions of a service provider who receives such cards from customers and then returns them. Alternatively, a coded record reading device may be of the type that receives data captured from a card or other type of coded record by a pneumatic carrier. In still other embodiments the coded record reading device may include a wireless and/or contactless card reader. Such a reader may operate to read data on user cards or other items that are retained by persons in their vehicles. The reader may operate to read the data by the person placing their card in proximity to the reader. The data read from cards may correspond to a financial account of an associated user. At least one processor may operate to record the card data at the service provider station. The at least one processor may then operate responsive to manual inputs through input devices and/or other data, to cause operative communication between the service provider station and one or more remote computers. Such communications may be operative to cause associated charges for items delivered to respective customers to be assessed to the financial account associated with the data read from the respective user's card. Of course these approaches are exemplary.

The exemplary embodiment further includes a control device 214. The control device 214 may include an audio communication device schematically indicated 216. The audio communication device may be used by a service provider for selectively communicating with customers in the adjacent drive-through lane, or in remote drive-through lanes or other locations where transactions are processed. A control device 212 may receive inputs and provide outputs to the service provider that enables the service provider to control various transaction functions to be carried out. This may include for example causing the transport of pneumatic tube carriers to or from customers located at customer stations connected in the system. Alternatively or in addition the control device may be operative to control the orientation of delivery devices or other devices which will enable the service provider to engage in activities which are appropriate for the particular type of transaction system.

In addition the exemplary embodiment of the transaction system includes a pneumatic terminal 218. In exemplary embodiments the pneumatic terminal may be similar to the service provider terminal previously discussed. The pneumatic terminal 218 may enable the service provider to exchange items with customers through pneumatic tube carriers or other movable devices. Of course it should be understood that in other embodiments other types of conveyors may be employed for moving items between a service provider and remote customers. These may include for example, tape conveyors, motorized conveyors or other transport devices of various types.

The exemplary embodiment of the delivery device 206 is adapted to enable a service provider to exchange items with users located in vehicles in the drive-through lane. The exemplary embodiment of the delivery device particularly facilitates exchanging items through the device at a vertical level that is best suited for the height of the customer within their vehicle. As can be appreciated, customers in drive-through environments may be located in vehicles that range from low, compact and sports cars to tall trucks and vans. It is often difficult in providing devices used for exchanging articles, to position the articles at a height that is suitable for the broad range of vehicle heights that may be encountered. The exemplary embodiment of the delivery device 206 addresses this requirement by providing a plurality of delivery stations which are at different vertical levels. As a result the exemplary embodiment enables the service provider from the service provider station to place items to be exchanged with a customer at a delivery station which has a vertical level that corresponds relatively closely to the height of the customer user positioned in their vehicle. This facilitates carrying out the transactions for both the customer and the service provider.

The exemplary embodiment of the delivery device 206 includes a rotatable device 220. The exemplary form of the rotatable device has a generally cylindrical overall shape and at least a portion thereof rotates within the wall opening 204. The exemplary embodiment includes a delivery station 222 and a delivery station 224. The delivery stations are separated in the exemplary embodiment by a dividing wall 226. In the exemplary embodiment the delivery station 222 is positioned vertically lower than the delivery station 224. In the exemplary embodiment the delivery device is structured so that when delivery station 224 is adjacent to and accessible by a customer from the drive-through lane, delivery station 222 is accessible to the service provider from the interior area and vice versa.

Figure 14:
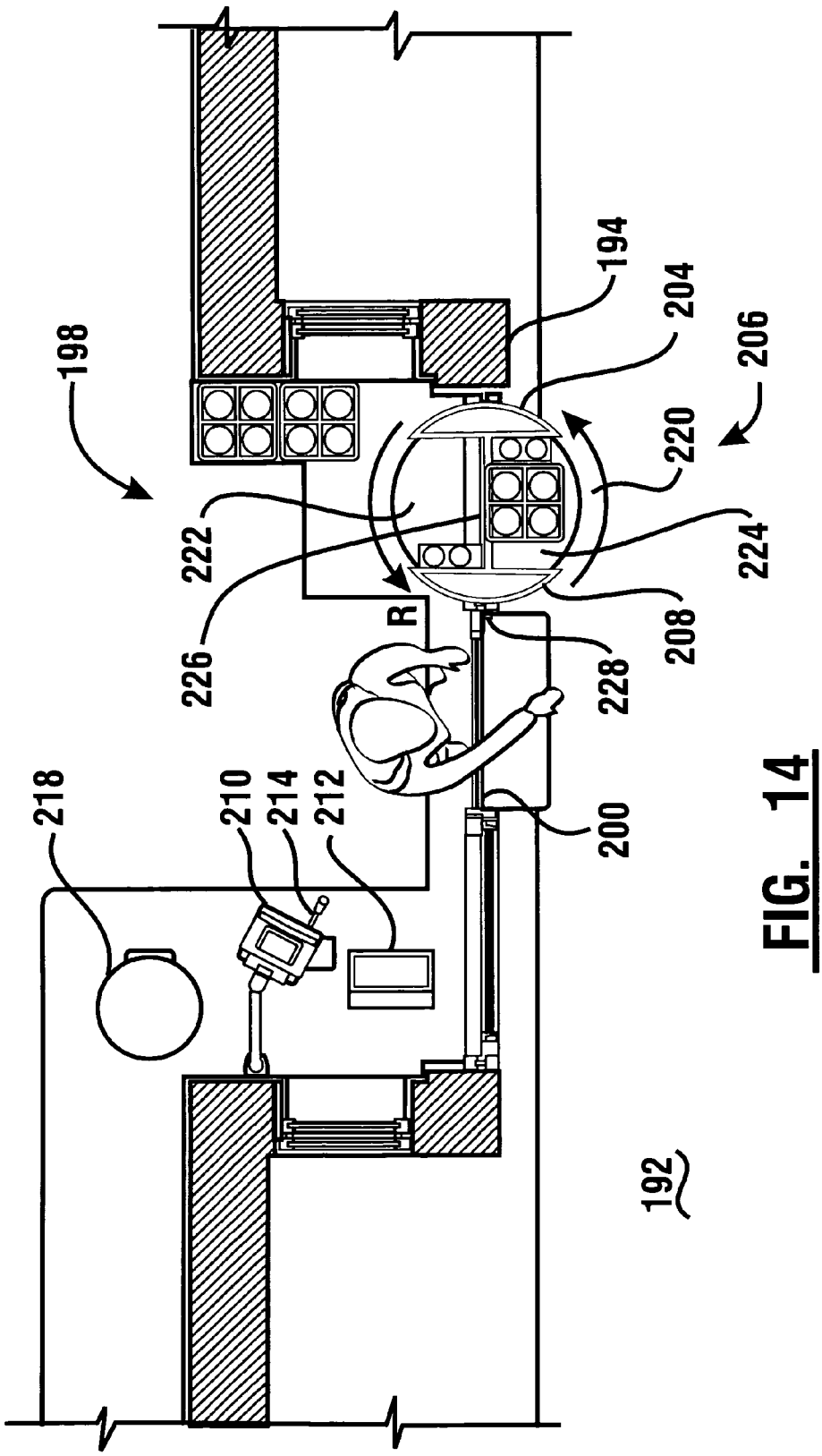
FIG. 14 is a top sectional view of the exemplary service provider station and drive-through lane.

In the exemplary embodiment the opening 204 is provided with suitable devices for guiding the movement of the rotatable device 270 therein. These may include sealing devices, rollers and/or other guides that facilitate the movement of the rotatable device while extending in the wall opening. In the exemplary embodiment the rotatable device 220 is rotatable in the direction of Arrows R as shown in FIG. 14. The exemplary rotatable device is rotatable responsive to inputs from the user to the control device 214. In the exemplary embodiment such inputs are operative to control a motor or other suitable driving device that is operative to move the rotatable device 220 to a desired position. Further in the exemplary embodiment, the rotatable device is selectively rotatable so that one of the plate sections 208 is positioned so as to extend in the opening 204 and block access to the delivery stations from the exterior area outside the building wall. This may be done for example, when the service provider is not servicing customers or when the facility is closed. In addition the exemplary embodiment includes a lock 228 which can be selectively actuated by the service provider to hold the rotatable device in a fixed rotational position relative to the opening. In this way the rotatable device can be locked in a position with a plate section blocking exterior access through the opening at times when the facility is not in service. Of course it should be understood that this approach is exemplary and in other embodiments other approaches may be used.

In the exemplary embodiment of the rotatable device 220, the device includes a generally circular base 230. The generally circular base 230 operatively supports the delivery stations thereon. In the exemplary embodiment the vertically lowermost delivery station 222 is positioned directly above the circular base so as to enable the service provider to exchange items 232 with customers who are positioned in vertically lower vehicles. In the exemplary embodiment the delivery station 224 includes a shelf 234 which is supported vertically above the base and which extends radially outward relative to the dividing wall 226. Shelf 234 can be used to exchange items with customers in vehicles that are vertically higher than those customers in vehicles for which the delivery station 222 is used. Further it should be understood that although in the exemplary embodiment only two delivery stations are shown, other embodiments may include greater numbers of deliver stations. Further in some embodiments the exchange of items with customers may be accomplished through the use of rotatable devices which include only one delivery station. Further in some alternative embodiments multiple delivery devices may be used, each of which have one or more delivery stations which are arranged at different heights. Of course these approaches are exemplary and in other embodiments other approaches may be used.

FIG. 15 discloses an alternative configuration of a rotatable device 236. Rotatable device 236 employs similar principles to rotatable device 220 previously discussed. Rotatable device 236 includes delivery stations 238 and 240. Delivery stations are separated by a dividing wall 242. The rotatable device 236 is selectively rotatable in a wall opening 244.

Delivery stations 238 and 240 are configured to be deeper than delivery stations 222 and 224 of the prior embodiments. Thus for example as shown in FIG. 15, delivery station 240 may be accessed by a user extending their arm in the direction of Arrow T from their vehicle. In this way the alternative rotatable device 236 is enabled to handle the exchange of items that may include longer packages or different size configurations compared to delivery stations 222 and 224. Further in some exemplary embodiments one of the delivery stations 238 and 240 may be accessible simultaneously to both a service provider and customers. This may be useful in some situations as it may enable a service provider to pass a larger item to the user. Alternatively in some embodiments wall structures may be provided so that when delivery station 238 is accessible to the customer, it is not accessible by the service provider. Rather in this position delivery station 240 is accessible to the service provider but not to the customer. Then when the device is rotated, the accessibility is reversed. Of course it should be understood that these approaches are exemplary and in other embodiments other approaches may be used.

In the exemplary embodiment the delivery stations may be provided with pockets, containers, apertures or similar features to facilitate the exchange of items. These may include for example such features designed for the exchange of currency bills, coins, packages, tickets, checkbooks or other items. The nature and configuration of the particular features provided will depend on the type of transactions being conducted and the particular transaction environment in which the devices are used.

In operation of the exemplary system, the service provider may provide items to or receive items from a customer in the drive-through lane adjacent the exemplary service provider station. The service provider is enabled to observe the particular vertical height of the customer in their vehicle either through the window, the display connected to the camera or other available customer observation device. If the service provider is delivering items to the customer, the service provider may place items at a delivery station from the service provider station and may cause the rotatable device to rotate such that the delivery station thereof is positioned adjacent to the customer in their vehicle at the closest appropriate height. The customer may then receive items from and/or place items in the adjacent delivery station. The service provider may then rotate the delivery station to access the items from the service provider station. Further if items are to be provided or returned to the customer they can be placed in supporting connection with the appropriate delivery station. The rotatable device can then be rotated such that the particular delivery station becomes accessible to the customer.

The service provider also provides inputs through input devices of the service provider station to cause transfers of funds as may be appropriate. For example, charges can be assessed to a financial account for items provided to a person based on data read from that person's associated card. Alternatively, or in addition, a financial account corresponding to data read from a user's card, may be credited for items provided to the service provider by the user. Of course these approaches are exemplary and in other embodiments other approaches may be used.

By selectively positioning items to be provided to or received from the user at the delivery station having the appropriate height, the ability to exchange transaction items with a customer is facilitated. Of course in the exemplary embodiment the service provider is also afforded the capabilities to selectively open the transaction window 200 so as to directly exchange items with the customer. This may be helpful in some circumstances when the height of the customer in their vehicle does not correspond to the vertical height of the delivery station. Alternatively such an approach may be suitable for transaction environments when a customer is receiving goods from the transaction facility. Thus for example the service provider can receive the payment for the goods through the window while another service provider or an automated system is placing the goods to be delivered at the appropriate delivery station for delivery to the customer. Once the payment is received, the rotatable device may be rotated so as to deliver the items that have been paid for. Of course these approaches are exemplary and in other embodiments other approaches may be used.

Figure 16:
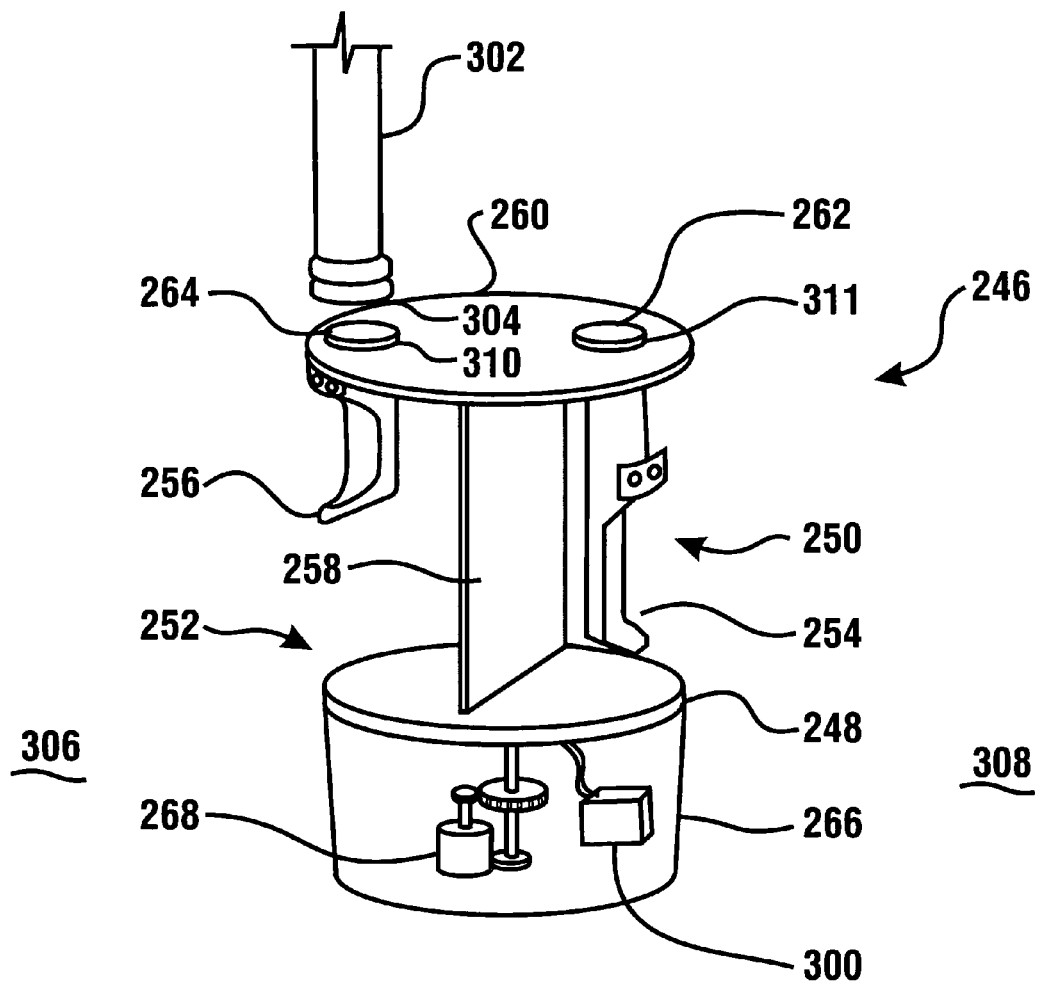
FIG. 16 is a perspective view of an alternative embodiment of a customer delivery station.

FIG. 16 shows an alternative customer terminal that may be used for exchanging items with customers who are positioned at different heights in vehicles. The exemplary device 246 includes a rotatable base 248. The base 248 includes a delivery station 250 and a delivery station 252 in supporting connection therewith. Each delivery station has an associated pneumatic carrier delivery and receiving device 254 and 256 respectively. Each carrier delivery and receiving device is operative to deliver and receive a pneumatic carrier in the manner like that previously discussed.

In the exemplary embodiment delivery stations 250 and 252 are separated by a dividing wall 258. The device further includes an upper member 260. Upper member 260 includes an aperture 262 associated with carrier delivery and receiving device 254 and an aperture 264 associated with carrier delivery and receiving device 256.

The exemplary embodiment further includes a pedestal 266. The pedestal 266 includes a drive motor 268 therein. Motor 268 is operative to selectively rotate and position rotatable base 248 selectively into a rotatable position. Pedestal 266 of the exemplary embodiment further includes a pneumatic pump 300 therein. Pump 300 is used for purposes of generating fluid pressure from pneumatic sealing devices in a manner that is later discussed.

In the exemplary embodiment a stationary pneumatic tube section 302 extends adjacent to upper member 260. Tube section 302 is part of a pneumatic item conveyor that may operate in a manner like that previously described. In the exemplary embodiment tube section 302 terminates in an open end 304 that is in close proximity to the upper member 260 and the apertures 262 and 264 therein.

In the exemplary embodiment the device 246 serves as a customer terminal that is operative to deliver and receive pneumatic tube carriers. In some embodiments customers may be positioned in vehicles in a drive-through lane 306 positioned on one side of the device. Alternatively in other embodiments customers serviced by the device may also be positioned in a drive-through lane 308 positioned on an opposed side of the device from drive-through lane 306.

In operation of the exemplary device 246 the service provider is enabled to exchange items with customers at one or both of the drive-through lanes 306, 308 by transferring the pneumatic tube carrier between the device 246 and the service provider station. In the exemplary embodiment the service provider through inputs through the control device, is enabled to selectively align one of the apertures 264, 262 with the end 304 of the tube section 302. Thereafter control circuitry is selectively operative to apply fluid pressure from the pump 300 to an expandable sealing device which extends adjacent to and in surrounding relation of the selected aperture. These expandable sealing devices 310, 311 may include in exemplary embodiments, annular expandable bladders that are selectively operative to place the tube section 302 in fluid communication with a selected one of the carrier delivery and receiving devices 254, 256. As a result the service provider is enabled to selectively receive a carrier from or deliver a carrier to the carrier delivery and receiving device that is currently aligned with the tube section.

In the exemplary embodiment once a carrier is delivered, the service provider is enabled to selectively rotate the rotatable base 248 so as to place the selected carrier receiving and delivery device adjacent to the customer in their vehicle. Thus as can be appreciated the service provider is enabled to selectively deliver a carrier to either the higher or lower carrier delivery and receiving device and then move that carrier delivery and receiving device, into a position that is adjacent to a window of the customer's vehicle. Likewise after a customer has placed a carrier in a carrier delivery and receiving device, the control circuitry is operative to place the aperture corresponding to that device in aligned relation with the opening 304. The control circuitry is thereafter operative to expand the appropriate expandable sealing device, and the blower in operative connection with the tube section 302 provides sufficient negative pressure to move the carrier upward in the transport tube.

Of course as can be appreciated, in some embodiments the tube section may be aligned with the aperture when the carrier delivery and receiving device is adjacent to one of the drive-through lanes. Alternatively in some embodiments the tube section may be positioned so that it may be necessary to rotate the device so as to move the carrier delivery and receiving device adjacent to each of the drive-through lanes. Of course it should be appreciated that this structure is exemplary and in other embodiments other structures to enable customers to more readily access the pneumatic tube carrier may be used.

Figure 17:
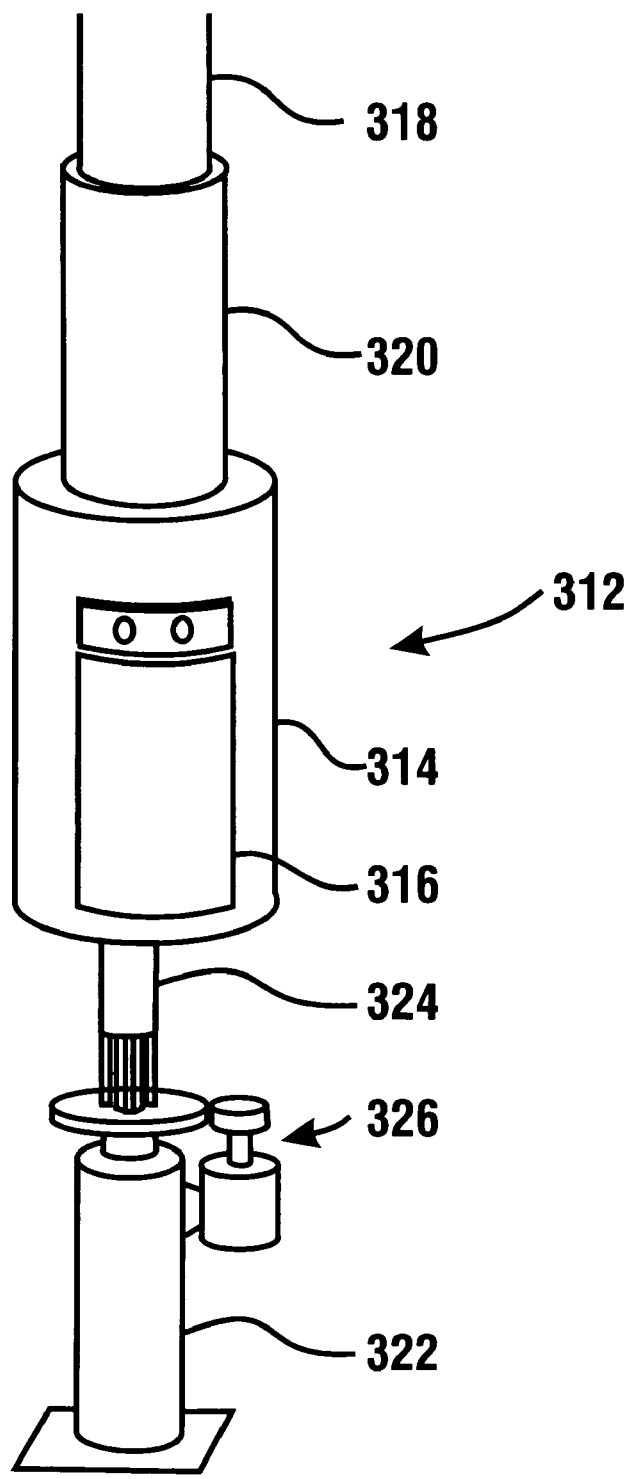
FIG. 17 is a perspective view of yet another alternative customer delivery station.

FIG. 17 discloses yet a further alternative embodiment of a remote delivery station for a pneumatic carrier. This assembly 312 includes a delivery station which includes a body 314. Body 314 includes an opening 316 therein which is suitable for accessing a pneumatic tube carrier. It should be understood that in some embodiments the body may operate in conjunction with captive carriers and in other embodiments the body may operate in conjunction with movable carriers. Further in some embodiments the opening 316 may be controlled through operation of a door or other similar device.

The body is in operative communication with a tube section 318. Tube section 318 is in operative connection with a pneumatic transport tube of the type previously discussed. The telescoping tube section 320 is operative in the exemplary embodiment to enable telescoping vertical movement of tube 318 and 320. This enables the body 314 to be vertically moved while maintaining generally fluid-tight engagement with tube 318.

The exemplary embodiment of the assembly 312 includes a cylinder 322. Cylinder 322 is in operative communication with a source of fluid pressure and suitable control circuitry. The control circuitry enables the selective application and release of fluid pressure so as to move a rod 324 selectively in the vertical direction. Rod 324 in the exemplary embodiment is in operative connection with body 314.

In addition in the exemplary embodiment the rod 314 is in operative communication with a rotating mechanism 326. Rotating mechanism 326 includes a motor or other suitable drive which is selectively operative to rotate the rod 324 and the body 314 which is in operative connection therewith.

In the exemplary operation of the assembly 312 a service provider is enabled to selectively position the vertical height of the opening through inputs provided through the control device. This enables the service provider to change the height of the opening so as to conform with the vertical height of the customer in the customer's vehicle. Further in the exemplary embodiment the service provider is enabled to rotate the opening to a position adjacent to a customer in their vehicle. Thus for example, the assembly 312 may be used in transaction environments in which there are drive-through lanes or other customer stations on opposed sides of the unit. The service provider is enabled to selectively position the opening of the unit to exchange items with customers on either selected side of the unit. Of course these approaches are exemplary.

It should be further understood that in some embodiments suitable controls may be provided at the customer station so as to enable the customer to selectively position the opening or other components. This may include for example suitable input devices that are operative to cause the control circuitry to vertically and/or rotationally move the body. Such controls may be in addition to those which are also used by the customer to send a pneumatic tube carrier or request audio communication with a service provider. Of course it should be understood that these approaches are exemplary, and in other embodiments other approaches may be used.

Exemplary embodiments described herein may be used in conjunction with the features described in U.S. patent application Ser. No. 11/825,790 filed Jul. 9, 2007, the disclosure of which is incorporated herein by reference.

It should be understood that the devices and systems shown and the methods of operation described are exemplary. Embodiments may include other types of apparatus and methods.

Thus the apparatus and method of the exemplary embodiments achieve one or more of the above stated objectives, eliminate difficulties encountered in the use of prior devices and systems, solve problems and attain at least some of the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown or described.

Any feature of the invention that is described in the following claims as a means for performing a function shall be construed as encompassing any means known to those skilled in the art to be capable of performing the recited function and shall not be deemed limited to the means disclosed in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
   at least one drive-through lane,
   a building, wherein the building is adjacent the at least one drive-through lane,
wherein the building includes a service provider station,
    wherein the service provider station is adjacent a drive-through lane of the at least one drive-through lane,
wherein the building includes an exterior wall that separates the service provider station from an exterior area,
    wherein the wall includes a wall opening,
wherein the wall is in supporting relation with a rotatable device which includes at least two delivery stations,
    wherein each delivery station is at a different vertical height from at least one other delivery station,
        wherein the different vertical heights respectively corresponding to different ranges of sitting heights of persons sitting in vehicles in the drive-through lane,
    wherein a first delivery station includes a first support member positioned at a first vertical height,
        wherein the first vertical height is to be used during a service provider station transaction with a person having a sitting height that is within a first range of sitting heights,
    wherein a second delivery station includes a second support member positioned at a second vertical height,
        wherein the second vertical height is to be used during a service provider station transaction with a person having a sitting height that is within a second range of sitting heights,
    wherein the second vertical height differs from the first vertical height,
wherein the rotatable device is movable by rotation about a substantially vertical axis,
    wherein during rotation, at least a portion of the rotatable device rotates in the wall opening,
    wherein the rotatable device is movable to cause the first delivery station to be selectively moved between an inner position in which the first support member is manually accessible from the service provider station but not from the exterior area,
        and
        an outer position in which the first support member is manually accessible from the exterior area but not from the service provider station,
    wherein the rotatable device is movable to cause the second delivery station to be selectively moved between
        an inner position in which the second support member is manually accessible from the service provider station but not from the exterior area,
        and
        an outer position in which the second support member is manually accessible from the exterior area but not from the service provider station,
wherein the rotatable device includes only one blocking section,
    wherein the blocking section is not usable by a service provider located in the service provider station to deliver at least one item to a person sitting in a vehicle in the drive-through lane,
    wherein the blocking section is sized relative to the opening,
wherein the rotatable device is movable to cause the blocking section to be selectively moved to an opening blocking position,
    wherein when the blocking section is in the opening blocking position, then the blocking section blocks manual access from the exterior area to each of the delivery stations,
    wherein when the blocking section is in the opening blocking position, then at least one of the delivery stations is manually accessible from the service provider station.

2. The apparatus according to claim 1 and further comprising
    wherein the service provider station includes a card reader,
        wherein the card reader is operable to read user data usable to identify a financial account that is usable to pay for an item provided to a person in a vehicle in the drive-through lane.

3. The apparatus according to claim 1 wherein the rotatable device includes at least one dividing wall, and wherein the at least one dividing wall horizontally separates each of the delivery stations from the blocking section.

4. The apparatus according to claim 1 wherein the building includes a motor that is operable to cause rotation of the rotatable device, wherein the motor is controllable from the service provider station.

5. The apparatus according to claim 1 wherein the blocking section comprises a convex outer surface portion.

6. The apparatus according to claim 1
    wherein the service provider station includes a payment window,
        wherein the window is selectively movable between an open position and a closed position,
            wherein the window in the open position causes a direct path to be provided between the service provider station and the exterior area,
                wherein a service provider in the service provider station is able to manually exchange cash through the direct path with a person sitting in a vehicle in the drive-through lane.

7. The apparatus according to claim 1
    wherein the first delivery station includes a plurality of first support members, wherein the plurality of first support members include the first support member, wherein the second delivery station includes a plurality of second support=members, wherein the plurality of second support members include the second support member.

8. The apparatus according to claim 7 wherein each first support member is within a first range of vertical heights, wherein each second support member is within a second range of vertical heights, and wherein the second range of vertical heights is outside of the first range of vertical heights.

9. The apparatus according to claim 1 wherein the building includes a bank, wherein the drive-through lane comprises a drive-through bank lane, wherein the rotatable device is rotatable to deliver cash from the service provider station to a bank customer in a vehicle in the drive-through bank lane.

10. The apparatus according to claim 1 wherein the building includes a pharmacy, wherein the drive-through lane comprises a drive-through pharmacy lane, wherein the rotatable device is rotatable to deliver a prescription medication from the service provider station to a customer in a vehicle in the drive-through pharmacy lane.

11. Apparatus comprising:
    at least one vehicle drive-through lane
    a building,
        wherein the building includes a service provider station,
            wherein the service provider station is adjacent a drive-through lane of the at least one drive-through lane, wherein the building includes an exterior wall,
wherein the wall separates the service provider station from a vehicle drive-through lane of the at least one vehicle drive-through lane,
wherein the wall includes a wall opening,
wherein the wall supports a delivery device which extends through the wall,
wherein the delivery device is rotatable about a vertical axis,
wherein the delivery device includes at least a first delivery section, a second delivery section, a first blocking section, and a second blocking section,
wherein the first delivery section includes an item support,
wherein the item support of the first delivery section is positioned at a first vertical height,
wherein the item support of the first delivery section is usable by a service provider located in the service provider station to provide at least one item to a person sitting in a vehicle in the drive-through lane when the person has a sitting height within a first range of sitting heights,
wherein the second delivery section includes an item support,
wherein the item support of the second delivery section is positioned at a second vertical height,
wherein the second vertical height differs from the first vertical height,
wherein the item support of the second delivery section is usable by a service provider located in the service provider station to provide at least one item to a person sitting in a vehicle in the drive-through lane when the person has a sitting height within a second range of sitting heights,
wherein the second range of sitting heights extends outside of the first range of sitting heights,
wherein the first delivery section does not include an item support positioned at the second vertical height,
wherein both the first blocking section and the second blocking section are not usable by a service provider located in the service provider station to provide at least one item to a person sitting in a vehicle in the drive-through lane,
wherein each section is selectively movable through rotation of the delivery device, to at least four different positions which include an inner facing position and an outer facing position,
wherein when a respective section is in the inner facing position, then the respective section both faces the service provider station and faces away from the drive-through lane,
wherein when the first delivery section is in the inner facing position:
the first delivery section is manually accessible by the service provider located in the service provider station but is not manually accessible by a person sitting in a vehicle in the drive-through lane, and
the second delivery section is manually accessible by a person sitting in a vehicle in the drive-through lane but is not manually accessible by the service provider located in the service provider station,
wherein when the first delivery section is in the outer facing position:
the first delivery section is manually accessible by a person sitting in a vehicle in the drive-through lane but is not manually accessible by the service provider located in the service provider station, and
the second delivery section is manually accessible by the service provider located in the service provider station but is not manually accessible by a person sitting in a vehicle in the drive-through lane,
wherein each blocking section comprises a convex outer surface portion,
wherein a blocking section extends through the wall opening when in the outer facing position,
wherein when one of the first and second blocking sections is in the outer facing position, then the other blocking section is in the inner facing position,
wherein both of the first and second blocking sections are sized relative to the wall opening,
wherein keeping one of the first and second blocking sections in the outer facing position when the service provider station is not in service blocks manual access from the drive-through lane to the service provider station through the wall opening.

12. The apparatus according to claim 11 wherein the second delivery section does not include an item support positioned at the first vertical height.

13. The apparatus according to claim 11 wherein the building includes a motor that is operable to cause rotation of the delivery device, wherein the motor is controllable from the service provider station.

14. The apparatus according to claim 11
wherein the wall includes a window,
wherein the window is spaced from the delivery device,
wherein the window allows the service provider while located in the service provider station, to view the person sitting in the vehicle in the drive-through lane,
wherein the window is selectively movable between an opened position and a closed position,
wherein the window in the opened position allows the service provider to directly manually exchange items with a person sitting in a vehicle in the drive-through lane.

15. The apparatus according to claim 11
wherein the first delivery section includes a plurality of first item supports, wherein the plurality of first item supports include the item support of the first delivery section,
wherein the second delivery section includes a plurality of second item supports, wherein the plurality of second item supports include the item support of the second delivery section.

16. The apparatus according to claim 11 wherein the building includes a bank, wherein the drive-through lane comprises a drive-through bank lane, wherein the delivery device is rotatable to deliver cash from the service provider station to a bank customer in a vehicle in the drive-through bank lane.

17. The apparatus according to claim 11 wherein the building includes a pharmacy, wherein the drive-through lane comprises a drive-through pharmacy lane, wherein the delivery device is rotatable to deliver a prescription medication from the service provider station to a customer in a vehicle in the drive-through pharmacy lane.

18. Apparatus comprising:
at least one drive-through lane,
a building, wherein the building is adjacent the at least one drive-through lane,
wherein the building includes a service provider station,
   wherein the service provider station is adjacent a drive-through lane of the at least one drive-through lane,
wherein the building includes an exterior wall,
   wherein the wall separates the service provider station from a vehicle drive-through lane,
   wherein the wall includes a wall opening,
   wherein the wall supports the delivery device which extends through the wall,
   wherein the delivery device is rotatable about a vertical axis,
   wherein the delivery device includes delivery sections,
      wherein the delivery sections include at least a first delivery section and a second delivery section,
      wherein the first delivery section includes an item support,
      wherein the item support of the first delivery section is positioned at a first vertical height,
      wherein the item support of the first delivery section is usable by a service provider located in the service provider station to provide at least one item to a person sitting in a vehicle in the drive-through lane when the person has a sitting height within a first range of sitting heights,
      wherein the second delivery section includes an item support,
      wherein the item support of the second delivery section is positioned at a second vertical height,
      wherein the second vertical height differs from the first vertical height,
      wherein the item support of the second delivery section is usable by a service provider located in the service provider station to provide at least one item to a person sitting in a vehicle in the drive-through lane when the person has a sitting height within a second range of sitting heights,
      wherein the second range of sitting heights extends outside of the first range of sitting heights,
   wherein the delivery device includes only one blocking section,
      wherein the blocking section is not usable by a service provider located in the service provider station to provide at least one item to a person sitting in a vehicle in the drive-through lane,
      wherein the blocking section is sized relative to the opening,
   wherein the first delivery section, the second delivery section, and the blocking section are each selectively movable through rotation of the delivery device to different positions,
      wherein the different positions include at least one inner position and at least one outer position,
      wherein when a respective section is in the at least one inner position, then the respective section is manually accessible by the service provider located in the service provider station but is not manually accessible by a person sitting in a vehicle in the drive-through lane,
      wherein when a respective section is in the at least one outer position, then the respective section is manually accessible by a person sitting in a vehicle in the drive-through lane but is not manually accessible by the service provider located in the service provider station,
      wherein keeping the blocking section in the at least one outer position when the service provider station is not in service keeps at least part of the opening blocked to manual access by a person sitting in a vehicle in the drive-through lane.

19. The apparatus according to claim 18 wherein the blocking section comprises a convex outer surface portion.

20. The apparatus according to claim 18 wherein the building includes a motor that is operable to cause rotation of the delivery device, wherein the motor is controllable from the service provider station.

21. The apparatus according to claim 18
wherein the service provider station includes a payment window,
   wherein the window is selectively movable between an open position and a closed position,
      wherein the window in the open position causes a direct path to be provided between the service provider station and the vehicle drive-through lane,
      wherein a service provider in the service provider station is able to manually exchange cash through the direct path with a person sitting in a vehicle in the drive-through lane.

22. The apparatus according to claim 18
wherein the first delivery section includes a plurality of first delivery section item supports, wherein the plurality of first delivery section item supports include the item support positioned at the first vertical height,
wherein the second delivery section includes a plurality of second delivery section item supports, wherein the plurality of second delivery section item supports include the item support positioned at the second vertical height.

23. The apparatus according to claim 22 wherein each first delivery section item support vertical height differs from each second delivery section item support vertical height.

24. The apparatus according to claim 22 wherein each first delivery section item support is within a first range of vertical heights, wherein each second delivery section item support is within a second range of vertical heights, and wherein the second range of vertical heights is outside of the first range of vertical heights.

25. The apparatus according to claim 18 wherein the building includes a bank, wherein the drive-through lane comprises a drive-through bank lane, wherein the delivery device is rotatable to deliver cash from the service provider station to a bank customer in a vehicle in the drive-through bank lane.

26. The apparatus according to claim 18 wherein the building includes a pharmacy, wherein the drive-through lane comprises a drive-through pharmacy lane, wherein the delivery device is rotatable to deliver a prescription medication from the service provider station to a customer in a vehicle in the drive-through pharmacy lane.

* * * * *